United States Patent
Francis

(10) Patent No.: US 11,175,261 B1
(45) Date of Patent: Nov. 16, 2021

(54) PIPELINE STATIC CHARGE DETECTION AND DISSIPATION SYSTEMS AND METHODS

(71) Applicant: Trinity Bay Equipment Holdings, LLC, Houston, TX (US)

(72) Inventor: Kirk Spencer Francis, Richmond, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/177,706

(22) Filed: Feb. 17, 2021

(51) Int. Cl.
    *G01N 27/61* (2006.01)
    *F16L 55/38* (2006.01)
    *F16L 101/30* (2006.01)

(52) U.S. Cl.
    CPC .............. *G01N 27/61* (2013.01); *F16L 55/38* (2013.01); *F16L 2101/30* (2013.01)

(58) Field of Classification Search
    CPC ...... F16L 2101/30; F16L 55/38; G01N 27/61; G01N 27/60
    See application file for complete search history.

(56) References Cited

U.S. PATENT DOCUMENTS

| | | | |
|---|---|---|---|
| 6,427,602 B1* | 8/2002 | Hovis | F16L 55/34 104/138.1 |
| 7,104,147 B2 | 9/2006 | Pots et al. | |
| 7,839,282 B1* | 11/2010 | Mathur | G01D 5/2405 340/562 |
| 2005/0104600 A1* | 5/2005 | Cotton | G01N 27/24 324/519 |
| 2008/0141474 A1* | 6/2008 | Kapustin | F16L 55/30 15/104.066 |
| 2018/0363827 A1* | 12/2018 | Vreenegoor | G01R 33/0005 |
| 2020/0174054 A1* | 6/2020 | Tung | G01R 29/24 |

* cited by examiner

*Primary Examiner* — Jeff W Natalini
(74) *Attorney, Agent, or Firm* — Conrad J. Hsu

(57) ABSTRACT

Techniques for implementing and/or operating a system that includes a pipe segment, in which the pipe segment includes tubing that defines a pipe bore and a fluid conduit within an annulus of the tubing, a bore device to be moved through the pipe bore of the pipe segment, in which the bore device includes an internal sensor that determines sensor data indicative of an electrical parameter that the bore device encounters while disposed in the pipe bore of the pipe segment and fluid blocking material implemented around the internal sensor, and a control sub-system communicatively coupled to the bore device. The control sub-system determines whether static charge is expected to be present in the pipe bore of the pipe segment based at least in part on the sensor data determined by the internal sensor of the bore device.

19 Claims, 8 Drawing Sheets

PIPELINE STATIC CHARGE DETECTION AND DISSIPATION SYSTEMS AND METHODS

BACKGROUND

The present disclosure generally relates to pipeline systems and, more particularly, to a static charge testing system that may be deployed in a pipeline system to detect and/or dissipate static charge present within a pipeline bore of the pipeline system.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to one or more pipe (e.g., midline and/or end) fittings, for example, which are used to connect a pipe segment to another pipeline component, such as another pipe fitting, another pipe segment, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water). To facilitate providing fluid isolation, the inner surface of pipe segment tubing that defines a pipe bore may be implemented as a continuous layer of solid material, such as plastic.

Nevertheless, in some instances, a pipeline system may be used to transport fluid, such as gas and/or liquid, that includes solid particles suspended therein. However, at least in some such instances, when a solid particle suspended in the fluid contacts (e.g., rubs against) solid material of a pipeline component, such as pipe segment tubing, one or more electrons may be transferred between the solid particle suspended in the fluid and the solid material of the pipeline component. In other words, when the solid material used to define a pipeline bore through the pipeline component is implemented using a non-conductive material, such as plastic, the transfer of electrons may result in static charge accumulating along the pipeline bore. When a dedicated path between the solid material of the pipeline component and ground (e.g., zero volts) is not present, at least in some instances, static charge accumulated in the pipeline bore may dissipate via an electrical arc, which may potentially affect (e.g., reduce) operational reliability and/or operational efficiency of a pipeline system in which the pipeline component is deployed, for example, due to the electrical arc releasing sudden a burst of energy (e.g., heat).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a system includes a pipe segment, in which the pipe segment includes tubing that defines a pipe bore and a fluid conduit within an annulus of the tubing, a bore device to be moved through the pipe bore of the pipe segment, in which the bore device includes an internal sensor that determines sensor data indicative of an electrical parameter that the bore device encounters while disposed in the pipe bore of the pipe segment and fluid blocking material implemented around the internal sensor, and a control sub-system communicatively coupled to the bore device. The control sub-system determines whether static charge is expected to be present in the pipe bore of the pipe segment based at least in part on the sensor data determined by the internal sensor of the bore device.

In another embodiment, a method of operating a static charge testing system includes inserting a first bore device of the static charge testing system into a pipeline bore of a pipeline system, injecting first propulsion fluid into the pipeline bore behind the first bore device to facilitate moving the first bore device along the pipeline bore, determining, using a first sensor in the first bore device, first sensor data indicative of presence of static charge in the pipeline bore while the first bore device is disposed in the pipeline bore, inserting a second bore device of the static charge testing system into the pipeline bore of the pipeline system, injecting second propulsion fluid into the pipeline bore behind the second bore device to facilitate moving the second bore device along the pipeline bore while the first bore device is concurrently disposed in the pipeline bore, and determining, using a second sensor in the second bore device, second sensor data indicative of whether static charge encountered by the first bore device in the pipeline bore has been successfully dissipated.

In another embodiment, a static charge testing system includes a bore device. The bore device includes an electrical parameter sensor that is connected to electrically conductive material on an outer surface of the bore device, fluid blocking material implemented around the electrical parameter sensor to define the outer surface of the bore device with a tapered end and to define an internal cavity within the bore device, in which the tapered end and the internal cavity of the bore device enable the outer surface of the bore device to contract radially inward when the bore device passes from a first pipe bore of a first pipe segment to a fitting bore of a pipe fitting that is secured to the first pipe segment, and a spring disposed within the internal cavity of the bore device, in which the spring facilitates expanding the outer surface of the bore device radially outward when the bore device passes from the fitting bore of the pipe fitting to a second pipe bore of a second pipe segment that is secured to the pipe fitting.

DETAILED DESCRIPTION

Figure 1:
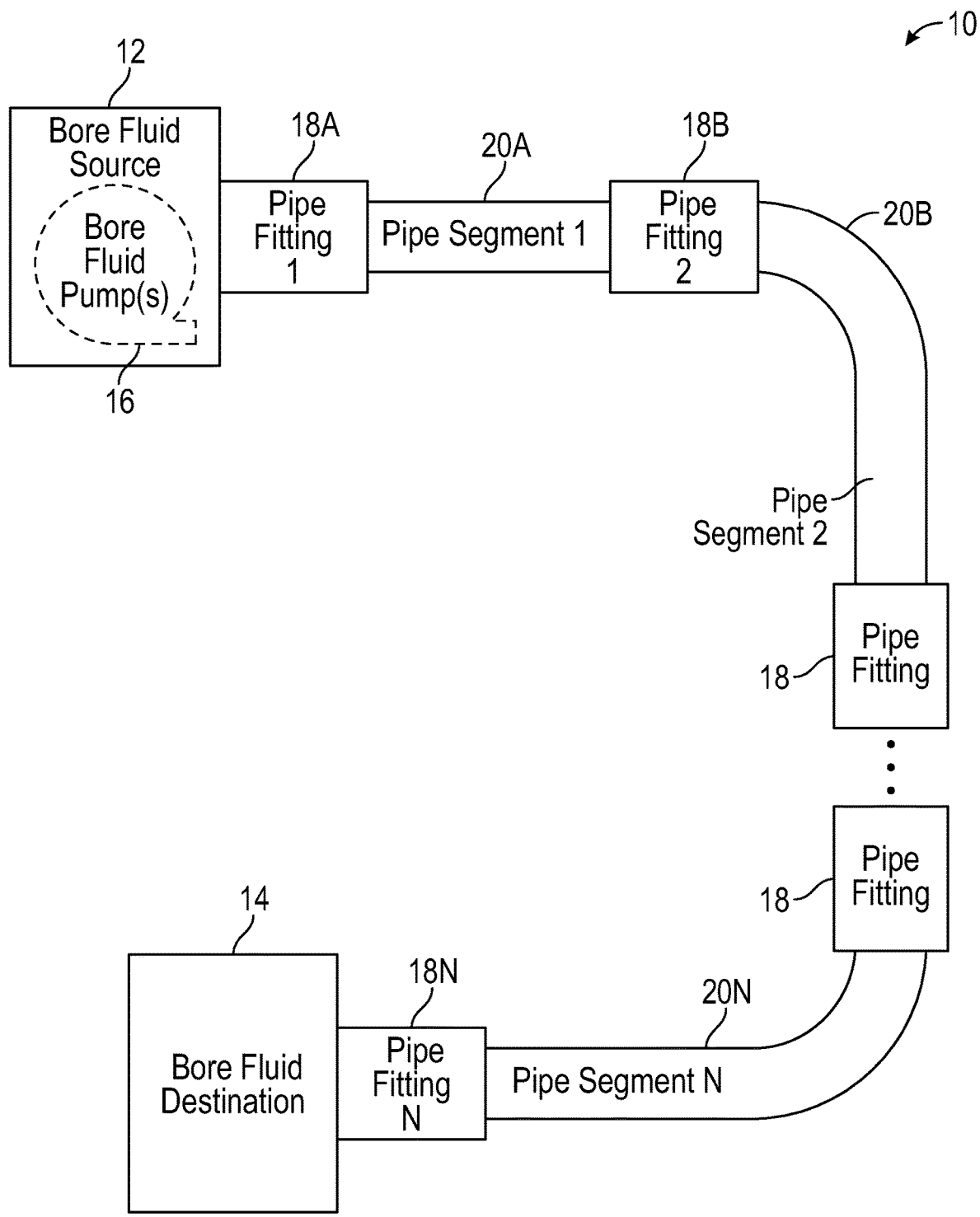
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation). To facilitate providing fluid isolation, at least in some instances, the inner surface of pipe segment tubing that defines a pipe bore may be implemented as a continuous layer of solid material, such as plastic.

In any case, as described above, in a pipeline system, a pipe segment may generally be secured and sealed in a pipe fitting. To enable fluid flow therethrough, a pipe fitting may generally include a fitting body (e.g., tube), which defines a fitting bore through the pipe fitting, for example, in addition to a fitting connector (e.g., flange) that is to be used to secure the pipe fitting to another pipeline component, such as another pipe fitting, a bore fluid source, or a bore fluid destination. In particular, in a pipeline system, the pipe segment tubing may generally be secured around the fitting body of the pipe fitting to facilitate fluidly coupling the pipe bore defined by the pipe segment tubing to the fitting bore defined by the fitting body of the pipe fitting.

Nevertheless, in some instances, a pipeline system may be used to transport (e.g., convey) fluid, such as gas and/or liquid, that includes solid particles suspended therein. For example, in a copper mining application, solid copper particles may be suspended in fluid, such as liquid sulfuric acid. As another example, in a gas production application performed in a desert environment, solid sand particles may be suspended in fluid, such as produced natural gas.

However, at least in some instances, when a solid particle contacts (e.g., rubs against) solid material of a pipeline component, one or more electrons may be transferred between the solid particle and the solid material of the pipeline component. For example, when a solid particle suspended in fluid contacts solid material on an inner surface of pipe segment tubing, which defines a corresponding pipe bore, the solid particle may transfer electrons to the solid material of the pipe segment tubing or vice versa. Additionally, as described above, in some instances, the inner surface of pipe segment tubing may be implemented using non-conductive material, such as plastic. In other words, at least in such instances, the transfer of electrons between the solid particle suspended in the fluid and the solid material of the pipe segment tubing may result in static charge accumulating on the inner surface of the pipe segment tubing and, thus, along the pipe bore.

Generally, static charge may try to discharge to ground (e.g., zero volts). However, when a dedicated path to ground is not present, in some instances, the static charge accumulated in a pipeline component may discharge through a non-conductive medium, such as air, via an electrical arc. In fact, dissipating static charge via an electrical arc may generally release a sudden burst of energy (e.g., heat), which, at least in some instances, may affect (e.g., reduce) operational reliability and/or operational efficiency of a pipeline system in which the pipeline component is deployed.

Accordingly, to facilitate improving pipeline operational reliability and/or pipeline operational efficiency, the present disclosure provides techniques for implementing and/or operating a static charge testing system that facilitates detecting and/or dissipating static charge present in a pipeline (e.g., pipe and/or fitting) bore of a pipeline system. As will be described in more detail below, a static charge testing system may include a control sub-system, one or more bore devices, and a propulsion fluid source. In particular, the control sub-system may generally control operation of the static charge testing (e.g., non-destructive testing) system.

Additionally, a bore device in a static charge testing system may generally be implemented to be inserted and run (e.g., moved and/or passed) through a pipeline. To facilitate running the bore device through a pipeline bore, the outer surface of the bore device may primarily be implemented using a fluid blocking material, such as polyurethane foam and/or metal, and the propulsion fluid source may be fluidly coupled to the pipeline bore. Thus, when the propulsion fluid source is operated to inject propulsion fluid into the pipeline bore behind the bore device, the flow of propulsion fluid in the pipeline bore may push the bore device forward along the pipeline bore.

To facilitate detecting static charge, a bore device of a static charge testing system may additionally include one or more internal sensors. In particular, the bore device may include one or more internal electrical parameter (e.g., voltage, current, and/or power) sensors, which are implemented and/or operated to generate sensor data indicative of magnitude and/or polarity of static charge and, thus, the presence of static charge in a pipeline bore. Additionally, in some embodiments, the bore device may include an internal location sensor, which is implemented and/or operated to determine sensor data indicative of the location of the bore device in a pipeline bore of a pipeline system. Furthermore, in some embodiments, a static charge testing system may additionally or alternatively include one or more location sensors, which are implemented to be disposed around a pipeline component and, thus, external from its one or more bore devices. In fact, in some embodiments, the static charge testing system may cross-correlate sensor data determined by an internal electrical parameter sensor of the bore device with sensor data determined by a (e.g., internal or external) location sensor to facilitate identifying the location at which static charge is present in a pipeline bore.

Moreover, in some embodiments, one or more internal sensors of a bore device may be encased (e.g., enclosed) within fluid blocking material of the bore device. In other words, in such embodiments, an internal electrical parameter sensor of the bore device may be implemented to determine sensor data indicative of presence and/or one or more electrical parameters of static charge in a pipeline bore without directly contacting the inner surface of a pipeline component that defines the pipeline bore. In particular, in such embodiments, the internal electrical parameter sensor of the bore device may instead determine sensor data indicative of presence and/or one or more electrical parameters of static charge in the pipeline bore based at least in part on capacitive coupling induced in the internal electrical parameter sensor due to an electric field resulting from the static charge.

However, to enable an internal electrical parameter sensor to determine sensor data indicative of presence and/or one or more electrical parameters of static charge in a pipeline bore, in other embodiments, the internal electrical parameter sensor may be electrically connected to an inner surface of a pipeline component that defines the pipeline bore via electrically conductive material, such as metal. In other words, in such embodiments, the outer surface of the bore device may include fluid blocking material as well as electrically conductive material that is connected to an internal electrical parameter sensor. For example, the electrically conductive material may be a ring that bi-sects the fluid blocking material implemented on the outer surface of the bore device.

In fact, when electrically conductive material implemented on its outer surface is connected to an internal electrical parameter sensor, in some embodiments, a bore device may additionally include a cover assembly, which is implemented and/or operated to selectively cover (e.g., block) the electrically conductive material on its outer surface. In particular, in some such embodiments, the cover assembly may be operated to cover the electrically conductive material on the outer surface of the bore device while the bore device is passing through a section of a pipeline bore in which static charge is not expected to be present and to expose the electrically conductive material on the outer surface of the bore device while the bore device is passing through a section of the pipeline bore in which static charge could potentially be present. In other words, in such embodiments, the cover assembly may be operated to cover the electrically conductive material on the outer surface of the bore device while the bore device is passing through a section of a pipeline bore defined using electrically conductive material and to expose the electrically conductive material on the outer surface of the bore device while the bore device is passing through a section of the pipeline bore defined using non-electrical conductive material. For example, the cover assembly may be operated to cover the electrically conductive material on the outer surface of the bore device while the bore device is passing through a fitting bore of a pipe fitting and to expose the electrically conductive material while the bore device is passing through a pipe bore of a pipe segment.

In any case, as described above, in some embodiments, a pipe segment may be secured to a pipe fitting at least in part by securing its pipe segment tubing around the fitting body of the pipe fitting. In other words, in such embodiments, the diameter of the fitting bore defined by the fitting body may be smaller than the diameter of the pipe bore defined by the pipe segment tubing. Thus, to facilitate determining sensor data indicative of presence and/or one or more electrical parameters of static charge in the pipe bore, in some such embodiments, a bore device in a static charge testing system may be spring-loaded to enable the bore device to adaptively (e.g., dynamically) adjust its outer surface diameter, for example, to enable electrically conductive material connected to an internal electrical parameter sensor of the bore device to directly contact the inner surface of the pipe segment tubing.

In particular, to facilitate adaptively adjusting its outer surface diameter, in some embodiments, the fluid blocking material of a bore device may be implemented to define the outer surface of the bore device with a tapered (e.g., coned) end as well as an internal cavity within the bore device. Additionally, one or more springs may be disposed within the internal cavity of the bore device, for example, such that the one or more springs push against an inner surface of the fluid blocking material in the bore device. As such, when the bore device passes from a section (e.g., pipe bore) of a pipeline bore with a larger diameter to a section (e.g., fitting bore) of the pipeline bore with a smaller diameter, the tapered end and the internal cavity of the bore device may enable the one or more springs in the bore device and, thus, the outer surface of the bore device to be compressed inwardly in a radial direction. On the other hand, when the bore device passes from a section of a pipeline bore with a smaller diameter to a section of the pipeline bore with a larger diameter, the one or more springs in the bore device may push the fluid blocking material and, thus, the outer surface of the bore device outwardly in a radial direction.

In any case, to facilitate communicating static charge testing results to a user (e.g., operator and/or service technician), a bore device in a static charge testing system may be communicatively coupled to a control sub-system. In particular, in some embodiments, the bore device may include a device antenna that enables wireless communication with the control sub-system, for example, to transmit sensor signals indicative of sensor data determined (e.g., sensed and/or measured) by one or more internal sensors of the bore device. Additionally or alternatively, the bore device may include device memory that is implemented and/or operated to store sensor data determined by one or more internal sensors of the bore device to enable the control sub-system to subsequently retrieve (e.g., receive) the sensor data from the bore device, for example, via a wired connection, such as a wire or a cable.

To facilitate communication via a wired connection, in some embodiments, a bore device in a static charge testing system may include a device input/output (I/O) port. In some such embodiments, a control sub-system in the static charge testing system may retrieve (e.g., download) sensor data, which is determined by the bore device while disposed in a pipeline bore, after the bore device is removed from the pipeline bore via the device I/O port. However, in other such embodiments, a control sub-system in the static charge testing system and the bore device may communicate via a wired connection, such as a cable, while the bore device is disposed in a pipeline bore.

In fact, in some embodiments, maintaining a wired connection with a bore device in a static charge testing system while the bore device is disposed in a pipeline bore may facilitate dissipating static charge encountered by the bore device, for example, without producing an electrical arc. In particular, to facilitate dissipating static charge, in such embodiments, the bore device may include a switching device (e.g., demultiplexer) connected between an internal electrical parameter sensor of the bore device, electrically conductive material on the outer surface of the bore device, and a wired connection that is connected between the bore device and ground. In fact, in some such embodiments, the wired connection may be connected to the ground used by a control sub-system of the static charge testing system.

In any case, in such embodiments, to enable the internal electrical parameter sensor to determine sensor data, the switching device may be operated to electrically connect the electrically conductive material on the outer surface of the bore device to the internal electrical parameter sensor and to electrically disconnect the electrically conductive material from the wired connection. On the other hand, to facilitate dissipating static charge, the switching device may be operated to electrically disconnect the electrically conductive material on the outer surface of the bore device from the internal electrical parameter sensor and to electrically connect the electrically conductive material to the wired connection, thereby providing a dedicated path to ground. In fact, at least in some instances, connecting the electrically conductive material to the wired connection may facilitate dissipating static charge without producing an electrical arc, for example, due to the electrical connection being switched from the internal electrical parameter sensor to the wire connection in response to sensor data determined by the internal electrical parameter sensor being indicative of the presence of static charge and, thus, the electrically conductive material on the outer surface of the bore device already being in contact with the static charge when the electrical connection is switched over to the wired connection.

Moreover, in some embodiments, the propulsion fluid used to move a bore device of a static charge testing system along a pipeline bore may facilitate dissipating static charge in the pipeline bore, for example, without producing an electrical arc. In particular, to facilitate dissipating static charge, in some such embodiments, the propulsion fluid may be an ionic fluid, such as saltwater. Thus, in such embodiments, when the ionic propulsion fluid contacts solid material of a pipeline component at which static charge is present, one or more electrons may be transferred between the ionic propulsion fluid and the solid material of the pipeline component and, thus, facilitate neutralizing (e.g., dissipating) the static charge. For example, when the static charge has a negative polarity, the solid material of the pipeline component may transfer one or more electrons to the ionic propulsion fluid and, when the static charge has a positive polarity, the ionic propulsion fluid may transfer one or more electrons to the solid material of the pipeline component.

In fact, when a static charge testing system is capable of dissipating static charge itself, in some embodiments, to facilitate confirming that static charge in a pipeline bore has been successfully dissipated, multiple different bore devices of the static charge testing system may be serially (e.g., successively) run through the pipeline bore. In particular, in such embodiments, a first bore device of the static charge testing system may be moved in a pipeline bore, for example, using ionic propulsion fluid that is expected to dissipate static charge present in the pipeline bore. While the first bore device is still in the pipeline bore, a second bore device of the static charge testing system may then be moved in the pipeline bore to facilitate confirming that static charge previously encountered by the first bore device is no longer present in the pipeline bore. In this manner, as will be described in more detail below, the techniques described in the present disclosure may facilitate detecting and/or dissipating static charge present in a pipeline (e.g., pipe and/or fitting) bore of a pipeline system, which, at least in some instances, may facilitate improving operational reliability of the pipeline system, for example, at least in part by enabling static charge in the pipeline bore to be dissipated without producing an electrical arc.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., one or two) pipe segments 20 or more than three (e.g., four, five, or more) pipe segments 20. Additionally or alternatively, in other embodiments, a pipeline system 10 may include fewer than four (e.g., one, two, or three) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, in some embodiments, the tubing of a pipe segment 20 may be implemented using multiple different layers. For example, the tubing of a pipe segment 20 may include an inner barrier (e.g., internal pressure sheath) layer, which defines a pipe bore through the pipe segment 20, and an outer barrier (e.g., outer sheath) layer, which is implemented around the inner barrier layer. The tubing of the pipe segment 20 may additionally include one or more intermediate layers, such as an anti-wear layer, an intermediate sheath layer, an insulation layer, a pressure armor layer, and/or a tensile armor layer, implemented between its inner barrier layer and its outer barrier layer.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing the flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material in one or more of its intermediate layers. In fact, in some embodiments, an opening in defined in one or more intermediate layers of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both. Nevertheless, as described above, in some instances, a pipeline system 10 may be used to transport (e.g., convey) fluid, such as liquid and/or gas, that includes solid particles suspended therein.

Figure 2:
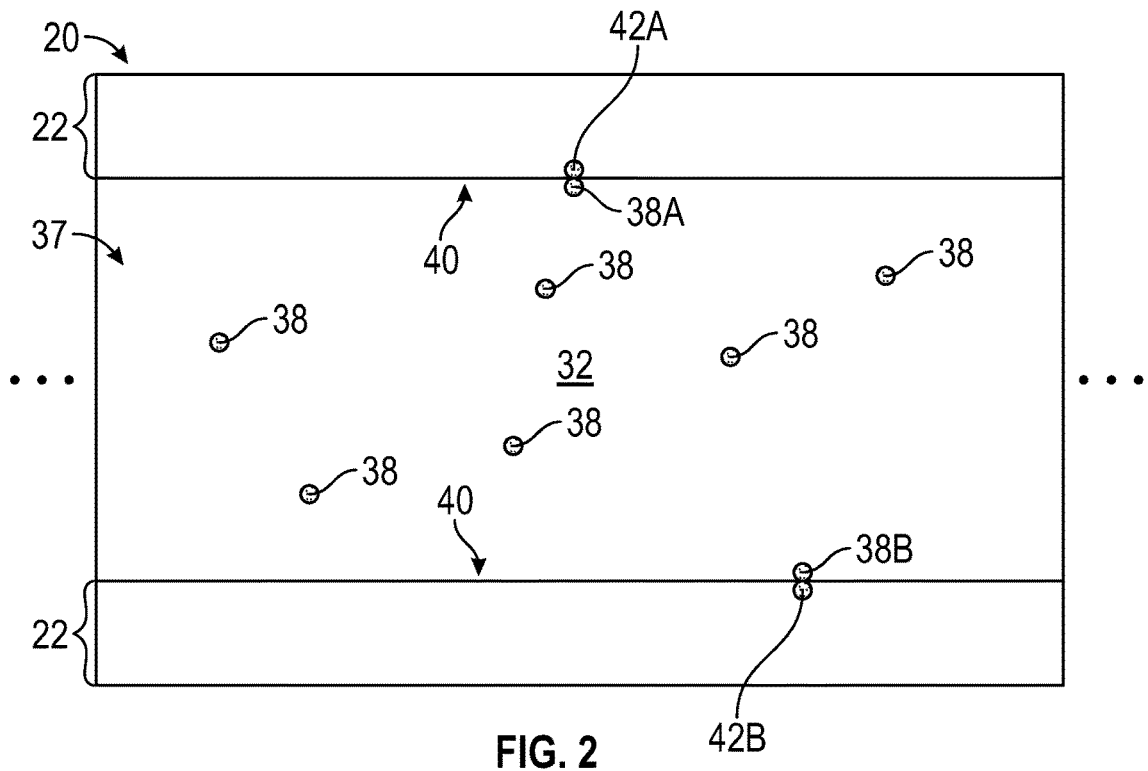
FIG. 2 is an axial cross-section profile of an example of a pipe segment conveying fluid with solid particles suspended therein, in accordance with an embodiment of the present disclosure.

To help illustrate, an example of fluid 37, which includes solid particles 38 suspended therein, flowing through a pipe bore 32 that is defined by the tubing 22 of a pipe segment 20 is shown in FIG. 2. For example, in a copper mining application, the solid particles 38 may include solid copper particles 38 suspended in liquid sulfuric acid ($H_2S$). As another example, in a gas production application performed in a desert environment, the solid particles 38 may be solid sand particles 38 suspended in produced natural gas.

In any case, as described above, when a solid particle 38 contacts (e.g., rubs against) the inner surface 40 of the pipe segment tubing 22, one or more electrons may be transferred between the solid particle 38 and the inner surface 40 of the pipe segment tubing 22. In some embodiments, the inner surface 40 of the pipe segment tubing 22 is formed using plastic, such as high-density polyethylene (HDPE), raised temperature polyethylene (PE-RT), cross-linked polyethylene (XLPE), polyamide 11 (PA-11), polyamide 12 (PA-12), polyvinylidene difluoride (PVDF), or any combination thereof. In other words, in such embodiments, the inner surface 40 the pipe segment tubing 22 may be implemented using non-conductive material.

Thus, in such embodiments, the transfer of electrons between the solid particle 38 suspended in the fluid 37 and the inner surface 40 of the pipe segment tubing 22 may result in static charge accumulating along the inner surface 40 of the pipe segment tubing 22 and, thus, the pipe bore 32. For example, when a first solid particle 38A suspended in the fluid 37 contacts a first molecule 42A on the inner surface 40 of the pipe segment tubing 22, the first solid particle 38A may transfer one or more electrons to the first molecule 42A or vice versa, thereby resulting in static charge accumulating at the first molecule 42A of the pipe segment tubing 22. Similarly, when a second solid particle 38B suspended in the fluid 37 contacts a second molecule 42B on the inner surface 40 of the pipe segment tubing 22, the second molecule 42B may transfer one or more electrons to the second solid particle 38B or vice versa, thereby resulting in static charge accumulating at the second molecule 42B of the pipe segment tubing 22.

Furthermore, as described above, when a dedicated path to ground is not present, in some instances, static charge may dissipate to ground (e.g., zero volts) via an electrical arc. However, at least in some instances, dissipating static charge in a pipeline (e.g., pipe and/or fitting) bore of a pipeline system via an electrical arc may potentially affect (e.g., reduce) operational reliability and/or operational efficiency of the pipeline system, for example, due to the electrical arc releasing sudden a burst of energy (e.g., heat). Accordingly, to facilitate improving pipeline operational reliability and/or pipeline operational efficiency, the present disclosure provides techniques for implementing and/or operating a static charge testing system to facilitate detecting and/or dissipating static charge present in a pipeline bore, for example, without producing an electrical arc.

Figure 3:
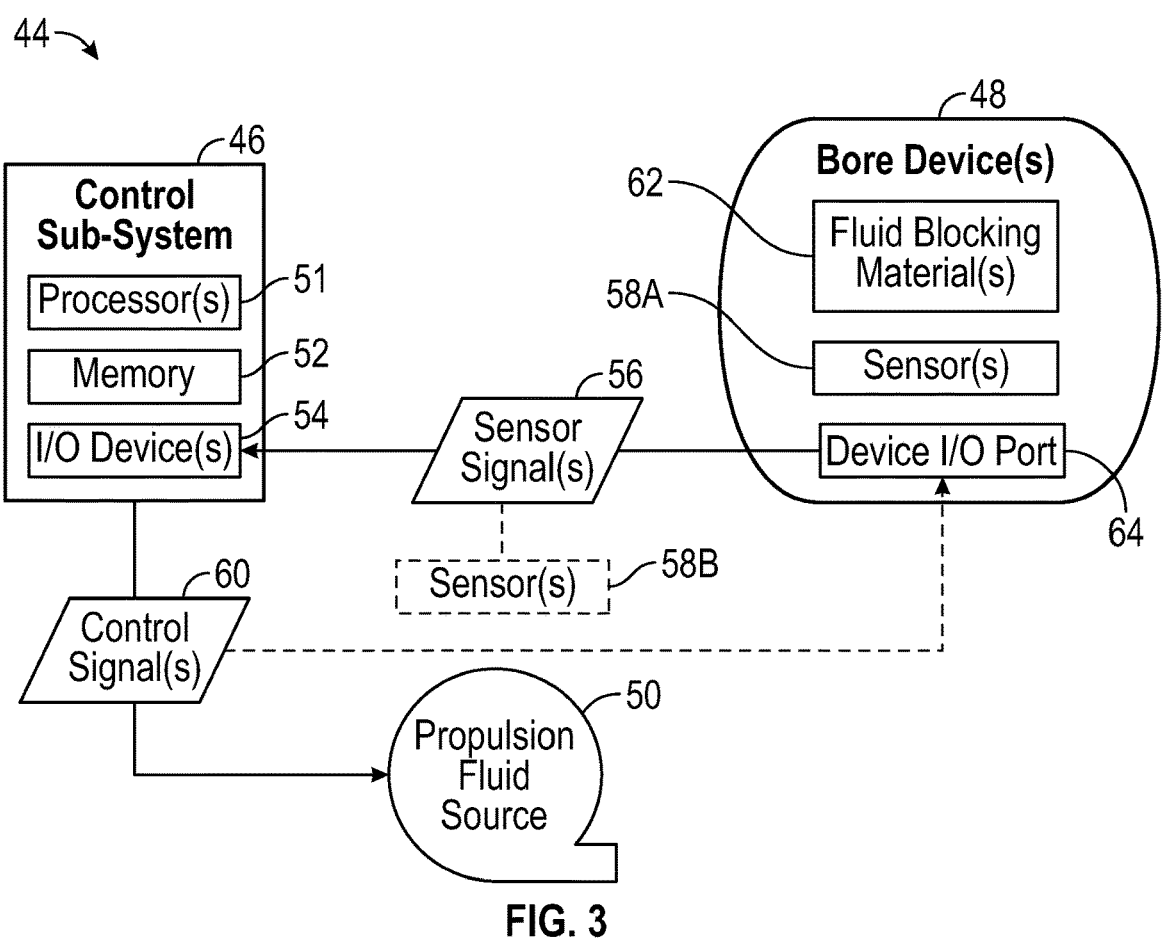
FIG. 3 is a block diagram of an example of a static charge testing system that includes a bore device, in accordance with an embodiment of the present disclosure.

To help illustrate, an example of a static charge testing system 44 is shown in FIG. 3. As depicted, the static charge testing system 44 includes a control sub-system 46, one or more bore (e.g., pig and/or pigging) devices 48, and a propulsion fluid source (e.g., pump and/or valve) 50. In particular, in some embodiments, the control sub-system 46 may generally control operation of the static charge testing system 44.

To facilitate controlling operation, as depicted, the control sub-system 46 includes one or more processors 51, memory 52, and one or more input/output (I/O) devices 54. In some embodiments, the memory 52 in the control sub-system 46 may include one or more tangible, non-transitory, computer-readable media that are implemented and/or operated to store data and/or executable instructions. For example, the memory 52 may store sensor data based at least in part on one or more sensor signals 56 received from a sensor 58. As such, in some embodiments, the memory 52 may include volatile memory, such as random-access memory (RAM), and/or non-volatile memory, such as read-only memory (ROM), flash memory, a solid-state drive (SSD), a hard disk drive (HDD), or any combination thereof.

Additionally, in some embodiments, a processor 51 in the control sub-system 46 may include processing circuitry that is implemented and/or operated to process data and/or to execute instructions stored in memory 52. In other words, in some such embodiments, a processor 51 in the control sub-system 46 may include one or more general purpose microprocessors, one or more application specific integrated circuits (ASICs), one or more field programmable gate arrays (FPGAs), or any combination thereof. For example, a processor 51 in the control sub-system 46 may process sensor data stored in memory 52 to facilitate detecting the presence and/or determining one or more electrical parameters of static charge in a pipeline bore of a pipeline system 10.

Additionally or alternatively, a processor 51 in the control sub-system 46 may execute instructions stored in memory 52 to determine one or more control (e.g., command) signals 60 that instruct the static charge testing system 44 to perform corresponding control actions. For example, the control sub-system 46 may determine a control signal 60 that instructs the propulsion fluid source 50 to inject propulsion fluid (e.g., liquid and/or gas) into a pipeline bore of a pipeline system 10. As another example, the control sub-system 46 may determine a control signal 60 that instructs an internal sensor 58A of a bore device 48 to return one or more sensor signals 56 indicative of corresponding electrical parameters, such as magnitude, polarity, and/or location, of static charge encountered by the bore device 48 in the pipeline bore.

To enable communication outside of the control sub-system 46, in some embodiments, the I/O devices 54 of the control sub-system 46 may include one or more input/output (I/O) ports (e.g., terminals). Additionally, to facilitate communicating the results of a static charge test to a user (e.g., operator or service technician), in some embodiments, the I/O devices 54 of the control sub-system 46 may include one or more user output devices, such as an electronic display, which is implemented and/or operated to display a graphical user interface (GUI) that provides a visual representation of the static charge test results (e.g., one or more electrical parameters of detected static charge). Furthermore, to enable user interaction with the static charge testing system 44, in some embodiments, the I/O devices 54 of the control sub-system 46 may include one or more user input devices, such as a hard button, a soft button, a keyboard, a mouse, and/or the like.

In any case, to facilitate detecting and/or dissipating static charge in a pipeline bore, a bore device 48 of the static charge testing system 44 may be run (e.g., moved and/or passed) through the pipeline bore. To facilitate running the bore device 48 through the pipeline bore, the propulsion fluid source 50 may be operated to cause propulsion fluid to be injected into the pipeline bore behind the bore device 48. To enable the propulsion fluid to move the bore device 48 in the pipeline bore, an outer surface of the bore device 48 may primarily be implemented using one or more fluid blocking materials 62, such as polyurethane foam and/or metal.

Furthermore, to facilitate detecting static charge in a pipeline bore, a bore device 48 of the static charge testing system 44 additionally includes one or more internal sensors 58A implemented within its fluid blocking material 62. In particular, the internal sensors 58A of the bore device 48 may include one or more internal electrical parameter sensors 58A, which are implemented and/or operated to determine sensor data indicative of one or more electrical parameters, such as magnitude and/or polarity, of static charge encountered by the bore device 48. In some embodiments, the one or more internal sensors 58A of the bore device 48 may additionally include an internal location sensor 58A, which is implemented and/or operated to determine sensor data indicative of location (e.g., position) of the bore device 48 in the pipeline bore, for example, to facilitate identifying a location in the pipeline bore at which static charge is present.

Additionally or alternatively, in some embodiments, the static charge testing system 44 may include one or more sensors 58B implemented external from its bore device 48. In particular, in some such embodiments, an external sensor 58B may be implemented on (e.g., around) pipe segment tubing 22. For example, an external location sensor 58B disposed on a portion of pipe segment tubing 22 may generate sensor data indicative of when a bore device 48 passes through the portion of the pipe segment tubing 22.

In any case, to enable communication with the control sub-system 46, as depicted, a bore device 48 in the static charge testing system 44 additionally includes a device input/output (I/O) port 64. For example, via the device I/O port 64, the bore device 48 may receive a control signal 60 from the control sub-system 46 that instructs an internal sensor 58A of the bore device 48 to determine sensor data and/or to transmit one or more sensor signals 56 indicative of the sensor data to the control sub-system 46. In other words, the static charge testing system 44 may detect the presence and/or one or more electrical parameters of static charge in a pipeline bore based at least in part on sensor data determined by a bore device 48 while the bore device 48 is disposed in the pipeline bore.

Figure 4:
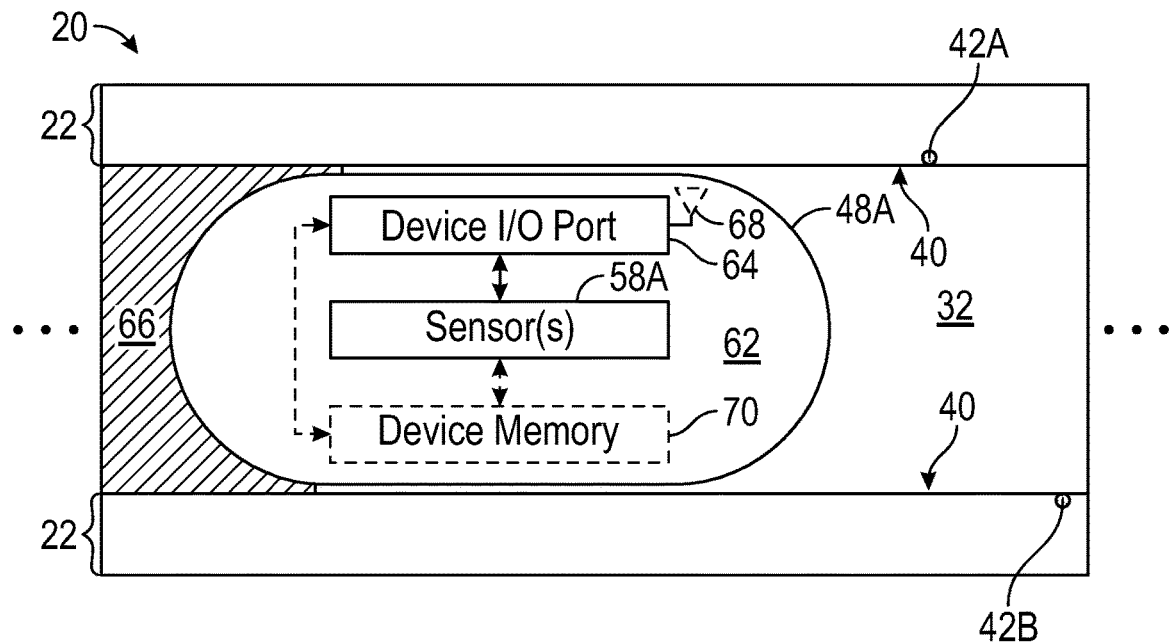
FIG. 4 is an axial cross-section profile of an example of the bore device of FIG. 3 disposed in a pipe bore of a pipe segment, in accordance with an embodiment of the present disclosure.

To help illustrate, an example of a bore device 48A disposed in a pipe bore 32 of a pipe segment 20 is shown in FIG. 4. As depicted, propulsion fluid 66 is present to the left of the bore device 48A. Thus, when pressurized (e.g., via propulsion fluid source 50), the propulsion fluid 66 may facilitate pushing the bore device 48A from left to right in the pipe bore 32.

Additionally, as depicted, the bore device 48A includes one or more internal sensors 58A and a device I/O port 64. In particular, as depicted, the one or more internal sensors 58A and the device I/O port 64 are encased (e.g., enclosed) within fluid blocking material 62 of the bore device 48A. In other words, in such embodiments, an internal sensor 58A of the bore device 48A may not directly contact an inner surface 40 of the pipe segment tubing 22 that defines the pipe bore 32.

Accordingly, in such embodiments, an internal electrical parameter sensor 58A of the bore device 48A may determine sensor data indicative of one or more electrical parameters, such as magnitude and/or polarity, of static charge in the pipe bore 32 based at least in part on capacitive coupling induced in the internal electrical parameter sensor 48A due to an electric field resulting from the static charge. For example, the internal electrical parameter sensor 58A may determine sensor data indicative of one or more electrical parameters of static charge at a first molecule 42A in the pipe segment tubing 22 based at least in part on capacitive coupling induced in the internal electrical parameter sensor 58A due to the electric field resulting from the static charge. Similarly, the internal electrical parameter sensor 58A may determine sensor data indicative of one or more electrical parameters of static charge at a second molecule 42B on the inner surface 40 of the pipe bore 32 based at least in part on capacitive coupling induced in the internal electrical parameter sensor 58A due to the electric field resulting from the static charge.

As described above, to facilitate determining presence and/or one or more electrical parameters of static charge, sensor data determined by an internal sensor 58A in the bore device 48A may be communicated to a corresponding control sub-system 46 via the device I/O port 64. Thus, as depicted, the one or more internal sensors 58A of the bore device 48A are communicatively coupled to the device I/O port 64. As in the depicted example, in some embodiments, the bore device 48A may additionally include a device antenna 68 that is communicatively coupled to the device I/O port 64 to enable the bore device 48A and the control sub-system 46 to wirelessly communicate, for example, in real-time or near real-time while the bore device 48A is disposed in the pipe bore 32.

However, in other embodiments, the bore device 48A may communicate sensor data determined by its one or more internal sensors 58A to a corresponding control sub-system 46 after the bore device 48A is removed from the pipe bore 32. Thus, to facilitate communicating sensor data to the control sub-system 46, in some such embodiments, the bore device 48A may additionally include device memory 70, which is implemented and/or operated to store sensor data determined by the one or more internal sensors 58A. In this manner, in such embodiments, the control sub-system 46 may download (e.g., retrieve) sensor data from the device memory 70 after the bore device 48A is removed from the pipe bore 32, for example, via a wired connection. As described above, based at least in part on the sensor data determined while the bore device 48A is disposed in the pipe bore 32, the control sub-system 46 may then determine the presence and/or one or more electrical parameters of static charge in the pipe bore 32.

However, it should be appreciated that the depicted example is merely intended to be illustrative and not limiting. In particular, in other embodiments, a bore device 48 of a static charge testing system 44 may not include device memory 70, for example, when sensor data determined by one or more internal sensors 58A of the bore device 48 is communicated to the control sub-system 46 of the static charge testing system 44 in real-time or near real-time. Additionally or alternatively, in other embodiments, a bore device 48 in a static charge testing system 44 may not include a device antenna 68, for example, when the bore device 48 and a control sub-system 46 of the static charge testing system 44 communicate via a wired connection. In fact, in some such embodiments, the bore device 48 and the control sub-system 46 may communicate via a wired connection while the bore device 48 is disposed in a pipeline (e.g., pipe and/or fitting) bore.

Figure 5:
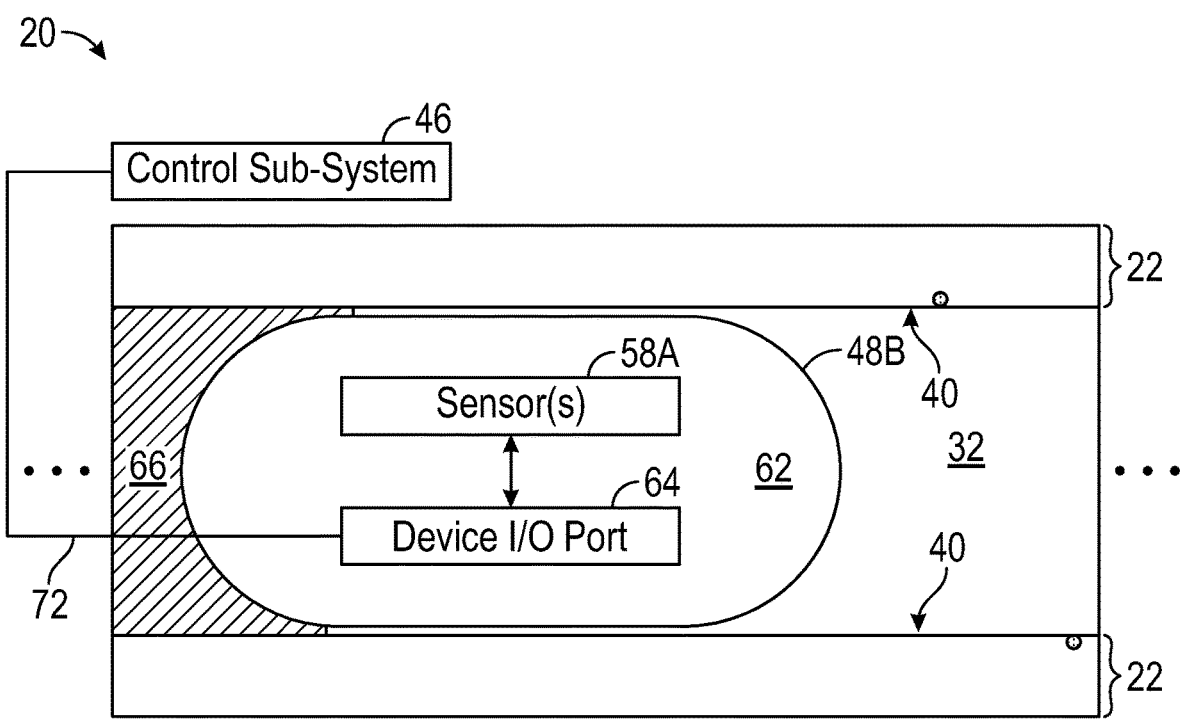
FIG. 5 is an axial cross-section profile of another example of the bore device of FIG. 3 that is tethered to a control sub-system while disposed in a pipe bore of a pipe segment, in accordance with an embodiment of the present disclosure.

To help illustrate, another example of a bore device 48B disposed in a pipe bore 32 of a pipe segment 20 is shown in FIG. 5. Similar to FIG. 4, as depicted in FIG. 5, propulsion fluid 66 is present to the left of the bore device 48B and, thus, may facilitate pushing the bore device 48A from left to right in the pipe bore 32 when pressurized, for example, by a propulsion fluid source 50. Additionally, similar to FIG. 4, as depicted in FIG. 5, the bore device 48B includes one or more internal sensors 58A and a device I/O port 64, which are encased (e.g., enclosed) within fluid blocking material 62 of the bore device 48B. Accordingly, in such embodiments, an internal electrical parameter sensor 58A of the bore device 48B may determine sensor data indicative of one or more electrical parameters, such as magnitude and/or polarity, of static charge in the pipe bore 32 based at least in part on an electric field produced by the static charge.

However, as depicted in FIG. 5, a wired connection 72 is connected between the bore device 48B and a corresponding control sub-system 46 while the bore device 48B is disposed in the pipe bore 32. In particular, in some embodiments, the wired connection 72 may include one or more wires and/or one or more cables. In any case, implementing in this manner may enable the bore device 48B and the control sub-system 46 to communicate while the bore device 48B is disposed in the pipe bore 32, for example, in real-time or near real-time. In fact, as will be described in more detail below, in some embodiments, maintaining a wired connection 72 with a bore device 48 while the bore device is disposed in a pipeline (e.g., pipe and/or fitting) bore may facilitate dissipating static charge in the pipeline bore, for example, at least in part by enabling the bore device 48 to selectively provide a dedicated path to ground directly or through an electrical energy storage device, such as a battery or a capacitor.

However, it should be appreciated that the depicted example is merely intended to be illustrative and not limiting. In particular, in other embodiments, one or more internal sensors 58A of a bore device 48 may not be fully encased (e.g., enclosed) within fluid blocking material 62 of the bore device 48. In other words, in some such embodiments, implementing the bore device 48 in that manner may enable an internal electrical parameter sensor 58A of the bore device 48 to determine sensor data indicative of one or more electrical parameters of static charge in a pipeline bore via an electrical connection with the inner surface of a pipeline component that defines the pipeline bore.

Figure 6:
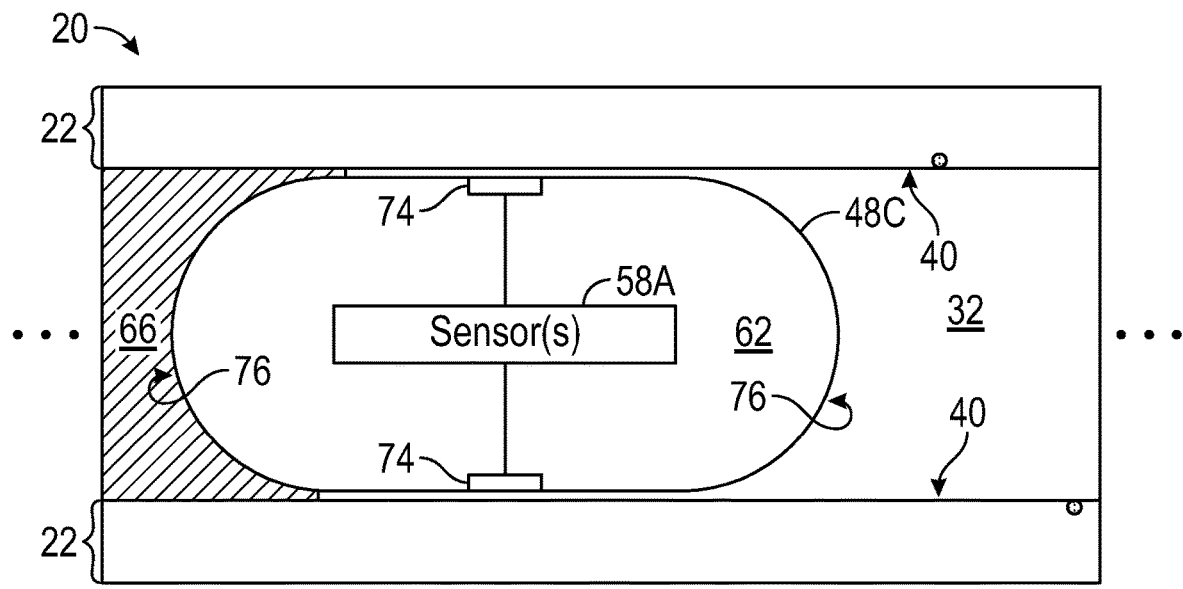
FIG. 6 is an axial cross-section profile of another example of the bore device of FIG. 3 with electrically conductive material exposed on its outer surface while disposed in a pipe bore of a pipe segment, in accordance with an embodiment of the present disclosure.

To help illustrate, another example of a bore device 48C disposed in the pipe bore 32 of a pipe segment 20 is shown in FIG. 6. Similar to FIG. 4, as depicted in FIG. 6, propulsion fluid 66 is present to the left of the bore device 48C and, thus, may facilitate pushing the bore device 48C from left to right in the pipe bore 32 when pressurized, for example, by a propulsion fluid source 50. Additionally, similar to FIG. 4, as depicted in FIG. 6, the bore device 48C includes one or more internal sensors 58A, which are implemented within fluid blocking material 62 of the bore device 48C, for example, in addition to including one or more device communication components, such as a device I/O port 64, a device antenna 68, and/or device memory 70.

However, as depicted in FIG. 6, electrically conductive material 74, such as metal, is exposed on an outer surface 76 of the bore device 48C. In particular, in some embodiments, the electrically conductive material 74 may be implemented at least in part as a ring that runs circumferentially along the outer surface 76 of the bore device 48C, for example, such that the electrically conductive material 74 bi-sects fluid blocking material 62 on the outer surface 76 of the bore device 48C. In other embodiments, the electrically conductive material 74 on the outer surface 76 of the bore device 48C may be implemented as multiple discrete sections.

In any case, in the depicted example, the electrically conductive material 74 exposed on the outer surface 76 of the bore device 48C is electrically connected to one or more internal sensors 58A of the bore device 48C. In other words, in this manner, an internal electrical parameter sensor 58A of the bore device 48C may be electrically connected to the outer surface 76 of the bore device 48C. As such, when the outer surface 76 of the bore device 48C directly abuts the inner surface 40 of the pipe segment tubing 22 that defines the pipe bore 32, the internal electrical parameter sensor 58A may determine sensor data indicative of presence and/or one or more electrical parameters of static charge in the pipe bore 32 based at least in part on an electrical connection with the inner surface 40 of the pipe segment tubing 22.

However, it should be appreciated that the depicted example is merely intended to be illustrative and not limiting. In particular, in other embodiments, electrically conductive material 74 on the outer surface 76 of a bore device 48 may be part of an internal electrical parameter sensor 58A in the bore device 48, for example, instead of being a separate component. Additionally or alternatively, as will be described in more detail below, in some embodiments, electrically conductive material 74 on the outer surface 76 of a bore device 48 may be selectively covered and, thus, blocked from contacting the inner surface of a pipeline component that defines a pipeline bore in which the bore device 48 is disposed. Moreover, as mentioned above, in some embodiments, a wired connection 72 may be connected to a bore device 48 while the bore device 48 is disposed in a pipeline bore, for example, to facilitate dissipating static charge encountered by the bore device 48 in the pipeline bore.

Figure 7:
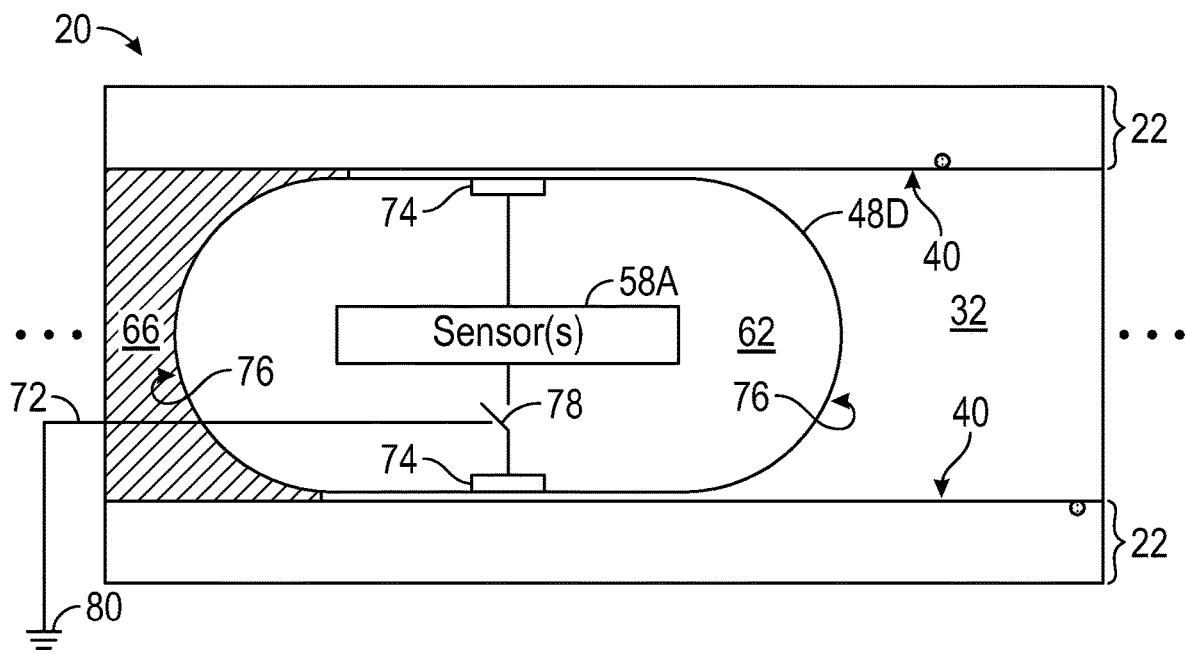
FIG. 7 is an axial cross-section profile of another example of the bore device of FIG. 3 that includes a switching device while disposed in a pipe bore of a pipe segment, in accordance with an embodiment of the present disclosure.

To help illustrate, another example of a bore device 48D disposed in a pipe bore 32 of a pipe segment 20 is shown in FIG. 7. Similar to FIG. 6, as depicted in FIG. 7, propulsion fluid 66 is present to the left of the bore device 48D and, thus, may facilitate pushing the bore device 48D from left to right in the pipe bore 32 when pressurized, for example, by a propulsion fluid source 50. Additionally, similar to FIG. 6, as depicted in FIG. 7, the bore device 48D includes one or more internal sensors 58A, which are implemented within fluid blocking material 62 of the bore device 48D, and electrically conductive material 74, which is exposed on the outer surface 76 of the bore device 48D and electrically connected to the one or more internal sensors 58A, for example, in addition to including one or more device communication components, such as a device I/O port 64, a device antenna 68, and/or device memory 70. Thus, in some embodiments, an internal electrical parameter sensor 58A of the bore device 48D may determine sensor data indicative of presence and/or one or more electrical parameters of static charge in the pipe bore 32 based at least in part on an electrical connection with the inner surface 40 of the tubing 22 of the pipe segment 20.

However, as depicted in FIG. 7, the bore device 48D additionally includes a switching device (e.g., demultiplexer) 78, which is electrically connected between an internal sensor 58A of the bore device 48D, electrically conductive material 74 on the outer surface 76 of the bore device 48D, and a wired connection 72 that is connected to the bore device 48D. As depicted, an opposite end of the wired connection 72 is connected to ground 80, for example, directly or through an electrical energy storage device, such as battery or a capacitor. In particular, in some embodiments, the wired connection 72 may be connected to the ground 80 that is used by a corresponding control sub-system 46.

Thus, to enable an internal electrical parameter sensor 58A of the bore device 48D to determine sensor data indicative of presence and/or one or more electrical parameters of static charge in the pipe bore 32, the switching device 78 may be operated to electrically connect the electrically conductive material 74 on the outer surface 76 of the bore device 48D to the internal electrical parameter sensor 58A and to electrically disconnect the electrically conductive material 74 from the wired connection 72. On the other hand, to facilitate dissipating static charge encountered by the bore device 48D, the switching device 78 may be operated to electrically connect the electrically conductive material 74 on the outer surface 76 of the bore device 48D to the wired connection 72 and to electrically disconnect the electrically conductive material 74 from the internal electrical parameter sensor 58A. In fact, at least in some instances, connecting the electrically conductive material 74 to the wired connection 72 may facilitate dissipating static charge without producing an electrical arc, for example, due to the electrical connection being switched from the internal electrical parameter sensor 58A to the wire connection 72 in response to sensor data determined by the internal electrical parameter sensor 58A being indicative of the presence of static charge and, thus, the electrically conductive material 74 on the outer surface 76 of the bore device 48D already being in contact with the static charge when switching device 78 switches the electrical connection over to the wired connection 72.

However, it should be appreciated that the depicted example is merely intended to be illustrative and not limiting. In particular, as described above, a pipe segment 20 is generally secured and sealed in a pipe fitting 18 to facilitate fluidly coupling a pipe bore 32 of the pipe segment 20 with a fitting bore of the pipe fitting 18. Thus, in some embodiments, a bore device 48 in a static charge testing system 44 may be implemented to pass through the fitting bore of one or more pipe fittings 18 in a pipeline system 10.

Figure 8:
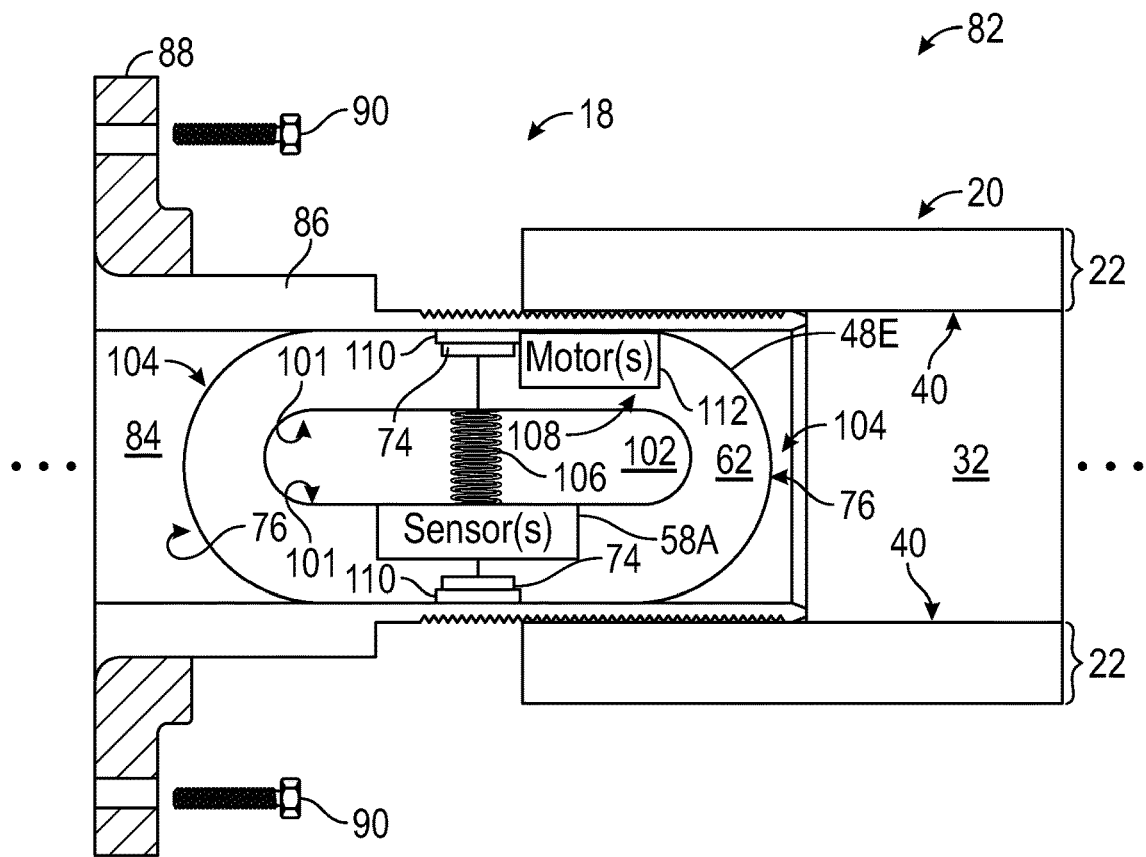
FIG. 8 is an axial cross-section profile of an example of the bore device of FIG. 3 while disposed in a fitting bore of a pipe fitting, in accordance with an embodiment of the present disclosure.

To help illustrate, another example of a bore device 48E disposed in a portion 82 of a pipeline system 10, which includes a pipe fitting 18 and a pipe segment 20, is shown in FIG. 8. Similar to FIG. 6, as depicted in FIG. 8, the bore device 48E includes one or more internal sensors 58A, which are implemented within fluid blocking material 62 of the bore device 48E, for example, in addition to including one or more device communication components, such as a device I/O port 64, a device antenna 68, and/or device memory 70. Additionally, similar to FIG. 6, as depicted in FIG. 8, the one or more internal sensors 58A of the bore device 48E are connected to electrically conductive material 74 on the outer surface 76 of the bore device 48E. Thus, in some embodiments, an internal electrical parameter sensor 58A of the bore device 48E may determine sensor data indicative of presence and/or one or more electrical parameters of static charge in a pipeline (e.g., pipe and/or fitting) bore based at least in part on an electrical connection with the inner surface of a pipeline component that defines the pipeline bore.

However, as depicted in FIG. 8, the bore device 48E is disposed within a fitting bore 84 that is defined by a fitting body 86 of the pipe fitting 18. In some embodiments, the fitting body 86 of the pipe fitting 18 may be implemented at least in part using metal, such as carbon steel, stainless steel, duplex stainless steel, super duplex stainless steel, or any combination thereof. In addition to the fitting body 86, in the depicted example, the pipe fitting 18 includes a fitting connector (e.g., flange) 88, which facilitates securing the pipe fitting 18 to another pipeline component, for example, via one or more threaded fasteners 90, such as a bolt.

In any case, as depicted, since the tubing 22 of the pipe segment 20 is secured around the fitting body 86 of the pipe fitting 18, the diameter of the fitting bore 84 is smaller than the diameter of the pipe bore 32. To facilitate accounting for diameter variations along a pipeline bore, as depicted, fluid blocking material 62 is implemented to define an internal cavity 102 within the bore device 48E. Additionally, as in the depicted example, the bore device 48E may include one or more tapered (e.g., coned) ends 104 and one or more springs 106, which are disposed within the internal cavity 102 such that they abut an inner surface 101 of the fluid blocking material 62.

As such, when the bore device 48E passes from a section (e.g., fitting bore 84) of the pipeline bore with a smaller diameter to a section (e.g., pipe bore 32) of the pipeline bore with a larger diameter, the one or more springs 106 in the bore device 48E may facilitate expanding the internal cavity 102 and, thus, the outer surface 76 of the bore device 48E outwardly in a radial direction. On the other hand, when the bore device 48E passes from a section (e.g., pipe bore 32) of the pipeline bore with a larger diameter to a section (e.g., fitting bore 84) of the pipeline bore with a smaller diameter, a tapered end 104 of the bore device may cause the outer surface 76 and, thus, the internal cavity 102 of the bore device 48E to compress inwardly in a radial direction. In other words, in this manner, the bore device 48E may be implemented to facilitate maintaining its outer surface 76 in direct contact with the inner surface of each pipeline component that defines a pipeline bore, for example, to enable an internal electrical parameter sensor 58A of the bore device to determine sensor data indicative of presence and/or one or more electrical parameters of static charge in the pipeline bore based at least in part on an electrical connection with the inner surfaces of the pipeline components that define the pipeline bore. In fact, in some embodiments, the one or more springs 106 disposed in the internal cavity 102 may be implemented using electrically conductive material, such as metal, and, thus, may facilitate electrically connecting an internal electrical parameter sensor 58A of the bore device 48E to the electrically conductive material 74 on the outer surface 76 of the bore device 48E.

In any case, as described above, in some embodiments, an inner surface 40 of the pipe segment tubing 22 may be implemented using non-conductive material, such as plastic. On the other hand, as described above, the fitting body 86 of the pipe fitting 18 may be implemented using electrically conductive material, such as metal. In other words, in such embodiments, static charge may be less likely to occur in the fitting bore 84 of the pipe fitting 18 than in the pipe bore 32 of the pipe segment 20.

To facilitate accounting for that fact, as in the depicted example, in some embodiments, the bore device 48E may additionally include a cover assembly 108, which is implemented and/or operated to selectively cover electrically conductive material 74 on the outer surface 76 of the bore device 48E that is electrically connected to one or more internal sensors 58A of the bore device 48E. To facilitate selectively covering the electrically conductive material 74, in the depicted example, the cover assembly 108 includes one or more sensor covers 110 and one or more motors (e.g., actuators) 112, which are connected (e.g., tied) to the one or more sensor covers 110. In particular, in some such embodiments, a motor 112 in the cover assembly 108 may operate to move the sensor cover 110 over the electrically conductive material 74 on the outer surface 76 of the bore device 48E when static charge is not expected to be present and to move the sensor cover 110 from over the electrically conductive material 74 on the outer surface 76 of the bore device 48E when static charge could potentially to be present. For example, the cover assembly 108 may be operated to cover the electrically conductive material on the outer surface 76 of the bore device 48E while the bore device 48E is within the fitting bore 84 and to expose the electrically conductive material on the outer surface 76 of the bore device 48E while the bore device 48E is within the pipe bore 32.

However, it should be appreciated that the depicted example is merely intended to be illustrative and not limiting. In particular, in other embodiments, a bore device 48 may include an internal cavity 102 and one or more springs 106 disposed in the internal cavity 102, but not a cover assembly 108. Additionally, in other embodiments, a bore device 48 may include a cover assembly 108, but not an internal cavity 102 or a spring 106. In any case, implementing and/or operating a static charge testing system 44 in accordance with the techniques described in the present disclosure may facilitate detecting and/or dissipating static charge in a pipeline bore, for example, without producing an electrical arc, which, at least in some instances, may facilitate improving pipeline operational reliability.

Figure 9:
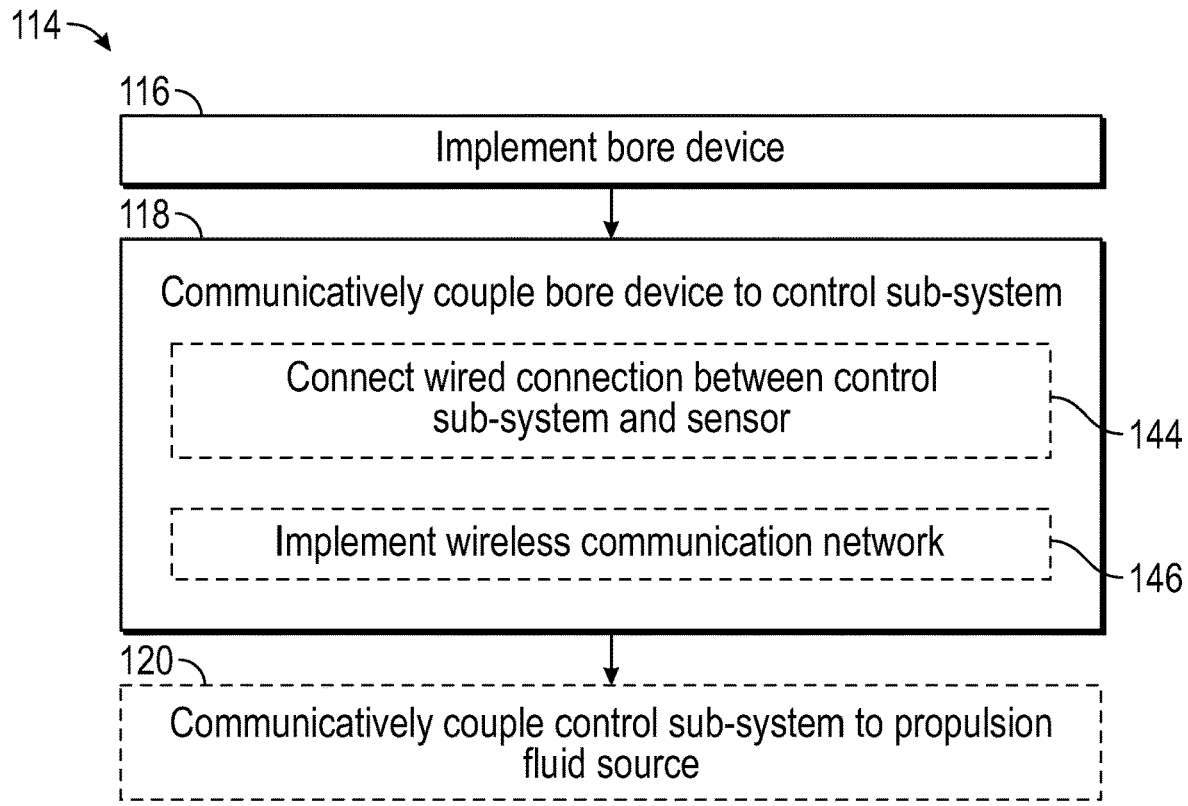
FIG. 9 is a flow diagram of an example of a process for implementing the static charge testing system of FIG. 3, in accordance with an embodiment of the present disclosure.

To help further illustrate, an example of a process 114 for implementing a static charge testing system 44 is described in FIG. 9. Generally, the process 114 includes implementing a bore device (process block 116). Additionally, the process 114 generally includes communicatively coupling the bore device to a control sub-system (process block 118).

Although described in a specific order, which corresponds with an embodiment of the present disclosure, it should be appreciated that the example process 114 is merely intended to be illustrative and not limiting. In particular, in other embodiments, a process 114 for implementing a static charge testing system 44 may include one or more additional process blocks and/or omit one or more of the depicted process blocks. For example, some embodiments of the process 114 may additionally include communicatively coupling the control sub-system to a propulsion fluid source (process block 120) while other embodiments of the process 114 do not.

In any case, as described above, a static charge testing system 44 generally includes one or more bore devices 48, a control sub-system 46, and a propulsion fluid source 50. As such, implementing the static charge testing system 44 may include implementing one or more bore devices 48 (process block 116). In particular, as described above, a bore device 48 may be implemented to determine sensor data indicative of presence and/or one or more electrical parameters of static charge encountered by the bore device 48 in a pipeline bore.

Figure 10:
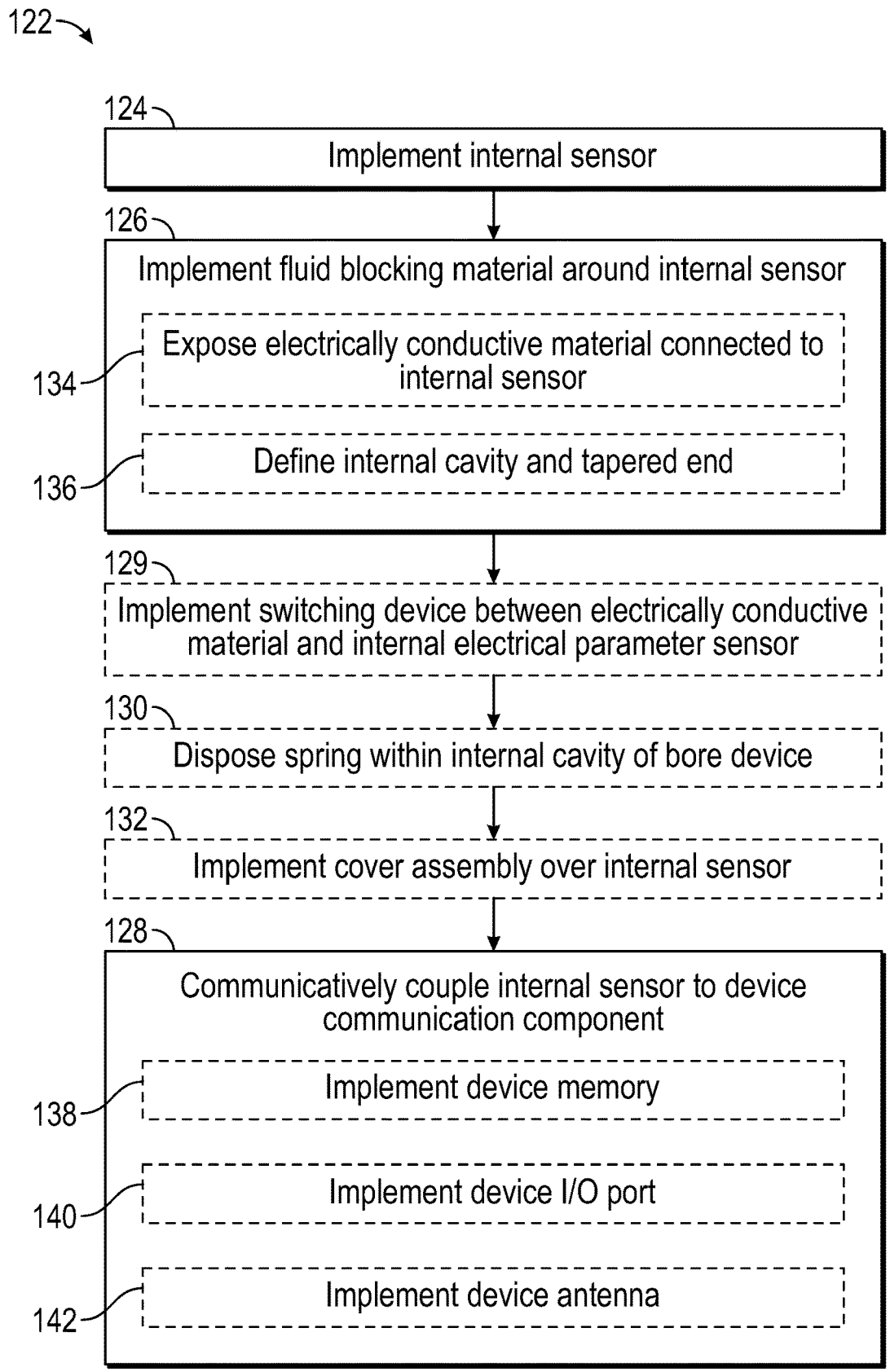
FIG. 10 is flow diagram of an example of a process for implementing the bore device of FIG. 3, in accordance with an embodiment of the present disclosure.

To help further illustrate, an example of a process 122 for implementing a bore device 48 is described in FIG. 10. Generally, the process 122 includes implementing an internal sensor (process block 124). Additionally, the process 122 generally includes implementing fluid blocking material around the internal sensor (process block 126) and communicatively coupling the internal electrical parameter sensor to a device communication component (process block 128).

Although described in a specific order, which corresponds with an embodiment of the present disclosure, it should be appreciated that the example process 122 is merely intended to be illustrative and not limiting. In particular, in other embodiments, a process 122 for implementing a bore device 48 may include one or more additional process blocks and/or omit one or more of the depicted process blocks. For example, some embodiments of the process 122 may additionally include implementing a switching device between electrically conductive material and an internal electrical parameter sensor of the bore device (process block 129) while other embodiments of the process 122 do not. As another example, some embodiments of the process 122 may additionally include disposing a spring within an internal cavity of the bore device (process block 130) while other embodiments of the process 122 do not. As a further example, some embodiments of the process 122 may additionally include implementing a cover assembly over the internal sensor (process block 132) while other embodiments of the process 122 do not. Moreover, in other embodiments, one or more of the depicted process blocks may be performed in a different order, for example, such that the internal sensor is communicatively coupled to the device communication component before fluid blocking material is implemented around the internal sensor.

In any case, as described above, a bore device 48 in a static charge testing system 44 generally includes one or more internal sensors 58A. As such, implementing the bore device 48 may include implementing one or more internal sensors 58A (process block 124). In particular, as described above, in some embodiments, the bore device 48 may include an internal location sensor 58A, which is implemented and/or operated to determine sensor data indicative of location of the bore device 48 in a pipeline bore.

Additionally, as described above, the bore device 48 may include one or more internal electrical parameter sensors 58A. In particular, as described above, in some embodiments, an internal electrical parameter sensor 58A of the bore device 48 may be implemented and/or operated to determine sensor data indicative of magnitude and/or polarity of static charge encountered by the bore device 48 in a pipeline bore based at least in part on capacitive coupling induced in the internal electrical parameter sensor 58A due to an electric field that results from the static charge. Additionally or alternatively, an internal electrical parameter sensor 58A may determine sensor data indicative of magnitude and/or polarity of static charge encountered by the bore device 48 in a pipeline bore based at least in part on an electrical connection with the inner surface of a pipeline component (e.g., pipe fitting 18 or pipe segment tubing 22) that defines the pipeline bore. In fact, as will be described in more detail below, in some embodiments, sensor data determined by an internal electrical parameter sensor 58A may be cross-correlated with sensor data determined by a (e.g., internal or external) location sensor 58 to determine one or more locations at which static charge is present in the pipeline bore.

As described above, a bore device 48 of a static charge testing system 44 may additionally include fluid blocking material 62 implemented around its one or more internal sensors 58A. As such, implementing the bore device 48 may include implementing fluid blocking material 62 around one or more internal sensors 58A of the bore device 48 (process block 126). In particular, as described above, in some embodiments, the fluid blocking material 62 may include polyurethane foam and/or metal. Additionally, as described above, in some embodiments, an internal electrical parameter sensor 58A of the bore device 48 may be enclosed within the fluid blocking material 62 of the bore device 48, for example, when the internal electrical parameter sensor 58A is implemented to determine sensor data indicative of one or more electrical parameters based at least in part on capacitive coupling resulting in the internal electrical parameter sensor 58A due to an electric field.

However, to enable an internal electrical parameter sensor 58A of a bore device 48 to determine sensor data indicative of one or more electrical parameters based at least in part on an electrical connection with the inner surface of a pipeline component that defines a pipeline bore, in other embodiments, fluid blocking material 62 may be implemented around the internal electrical parameter sensor 58A such that electrically conductive material 74, which is electrically connected to the internal electrical parameter sensor 58A, is exposed on the outer surface 76 of the bore device 48 (process block 134). In particular, as described above, in some embodiments, the fluid blocking material 62 may be implemented to expose a ring of electrically conductive material 74 on the outer surface 76 of the bore device 48, for example, such that the ring of electrically conductive material 76 bi-sects the fluid blocking material 62 on the outer surface 76 of the bore device 48. In other embodiments, the fluid blocking material 62 may be implemented to expose one or more discrete sections of electrically conductive material 74 on the outer surface 76 of the bore device 48.

To enable electrically conductive material 74 exposed on its outer surface 76 to facilitate dissipating static charge, as described above, in some embodiments, a bore device 48 may include a switching device 78 implemented between the electrically conductive material 74, an internal electrical parameter sensor 58A of the bore device 48, and a wired connection 72 that is connected to the bore device 48 while the bore device 48 is disposed in a pipeline bore. In other words, in such embodiments, implementing the bore device 48 may include implementing a switching device 78 between the electrically conductive material 74 on its outer surface 76 and the internal electrical parameter sensor 58A (process block 129). In particular, in some embodiments, the switching device 78 may be an electro-mechanical switching device 78 while, in other embodiments, the switching device 78 may be a semiconductor switching device 78 (e.g., one or more transistors).

In any case, as described above, to facilitate accounting for diameter variations along a pipeline (e.g., fitting and/or pipe) bore, in some embodiments, fluid blocking material 62 may additionally or alternatively be implemented to define an internal cavity 102 within the bore device 48 as well as to define the outer surface 76 with one or more tapered (e.g., coned) ends 104 (process block 136). In particular, in such embodiments, the one or more tapered ends 104 may facilitate compressing the internal cavity 102 and, thus, the outer surface 76 of the bore device 48 inwardly in a radial direction when the bore device 48 passes from a section (e.g., pipe bore 32) of a pipeline bore with a larger diameter to a section (e.g., fitting bore 84) of the pipeline bore with a smaller diameter. On the other hand, as described above, to facilitate expanding the outer surface 76 of the bore device 48, in some embodiments, one or more springs 106 may be disposed within the internal cavity 102 of the bore device 48 (process block 130). In particular, in such embodiments, the one or more springs 106 in the internal cavity 102 may facilitate expanding the internal cavity 102 and, thus, the outer surface 76 of the bore device 48 outwardly in a radial direction when the bore device 48 passes from a section (e.g., fitting bore 84) of a pipeline bore with a smaller diameter to a section (e.g., pipe bore 32) of the pipeline bore with a larger diameter.

Furthermore, as described above, in some embodiments, a bore device 48 in a static charge testing system 44 may include a cover assembly 108, which is implemented and/or operated to selectively cover electrically conductive material 74 on the outer surface 76 of the bore device that is electrically connected to an internal electrical parameter sensor 58A of the bore device 48. In other words, in such embodiments, implementing the bore device 48 may include implementing a cover assembly 108 over one or more internal sensors 58A of the bore device 48 (process block 132). In particular, as described above, in some such embodiments, the cover assembly 108 may be implemented at least in part by implementing a sensor cover 110 and connecting a motor (e.g., actuator) 112 to the sensor cover 110 to enable the motor 112 to selectively move the sensor cover 110 such that the sensor cover 110 blocks the electrically conductive material 74 or exposes the electrically conductive material 74. Merely as an illustrative non-limiting example, the motor 112 may be operated to move the sensor cover 110 over the electrically conductive material 74 when static charge is not expected to be present and to move the sensor cover 110 from over the electrically conductive material 74 when static charge could potentially be present, for example, to enable one or more internal electrical parameter sensors 58A to determine sensor data indicative of presence and/or one or more electrical parameters of the static charge based at least in part on an electrical connection with the inner surface of a pipeline component.

To facilitate externally communicating sensor data determined by its one or more internal sensors 58A, as described above, a bore device 48 may include one or more device communication components communicatively coupled to its one or more internal sensors 58A. In other words, implementing the bore device 48 may include communicatively coupling one or more device communication components to an internal sensor 58A of the bore device 48 (process block 128). In particular, as described above, in some embodiments, the one or more communication components of a bore device 48 may include device memory 70, which is implemented and/or operated to store sensor data determine by one or more internal sensors 58A of the bore device 48, for example, for subsequent retrieval and/or processing. In other words, in such embodiments, implementing the bore device 48 may include implementing device memory 70 and communicatively coupled the device memory 70 to one or more internal sensors 58A of the bore device 48 (process block 138).

Additionally or alternatively, as described above, in some embodiments, the one or more device communication components of a bore device 48 may include a device I/O port 64, which is implemented and/or operated to enable external communication with the bore device 48. In other words, in such embodiments, implementing the bore device 48 may include implementing the device I/O port 64 and communicatively coupling the device I/O port 64 to one or more internal sensors 58A of the bore device 48 (process block 140). In fact, in some such embodiments, the bore device 48 may additionally include one or more device antennas 68 communicatively coupled to its device I/O port 64 to enable wireless external communication with the bore device 48. In other words, in such embodiments, implementing the bore device 48 may include implementing a device antenna 68 and communicatively coupling the device antenna 68 to the device I/O port 64 and, thus, one or more internal sensors 58A of the bore device 48 (process block 142).

In this manner, a bore device 48 of a static charge testing system 44 may be implemented to enable the bore device 48 to determine and communicate sensor data, which is indicative of presence and/or one or more electrical parameters of static charge encountered by the bore device 48. In particular, as described above, the sensor data determined by the bore device 48 may be communicated to a control sub-system 46 of the static charge testing system 44, for example, for further processing and/or to facilitate communication to a user, such an operator or a service technician. Thus, returning to the process 114 of FIG. 9, implementing the static charge testing system 44 may include communicatively coupling one or more bore devices 48 of the static charge testing system 44 to the control sub-system 46 of the static charge testing system 44 (process block 118).

As described above, in some embodiments, a bore device 48 and a control sub-system 46 may be communicatively coupled via a wired connection 72. In other words, in such embodiments, communicatively coupling the bore device 48 and the control sub-system 46 may include connecting a wired connection 72, such as one or more cables, between the control sub-system 46 and the bore device 48 (process block 144). In particular, in some such embodiments, the wired connection 72 may be connected between an I/O device (e.g., I/O port) 54 of the control sub-system 46 and a device I/O port 64 of the bore device 48.

Additionally or alternatively, as described above, in some embodiments, a bore device 48 and a control sub-system 46 may be communicatively coupled via a wireless communication network. In other words, in such embodiments, communicatively coupling the bore device 48 and the control sub-system 46 may include implementing a wireless communication network (process block 146). In particular, to facilitate implementing a wireless communication network, in some embodiments, one or more antennas may be implemented at the control sub-system 46 to enable the control sub-system 46 to wireless communicate with one or more device antennas 68 implemented at the bore device 48.

Moreover, to facilitate autonomously controlling injection (e.g., supply) of propulsion fluid, in some embodiments, implementing the static charge testing system 44 may additionally include communicatively coupling the control sub-system 46 to the propulsion fluid source 50 (process block 120). For example, in such embodiments, the control sub-system 46 may instruct the propulsion fluid source 50 to inject propulsion fluid 66 via a control signal 60. However, in other embodiments, the control sub-system 46 may not be communicatively coupled to the propulsion fluid source 50, for example, when operation of the propulsion fluid source 50 is to be manually controlled. In this manner, a static charge testing system 44 may be implemented to enable the static charge testing system 44 to operate such that the static charge testing system 44 facilitates detecting and/or dissipating static charge present in a pipeline bore of a pipeline system 10.

Figure 11:
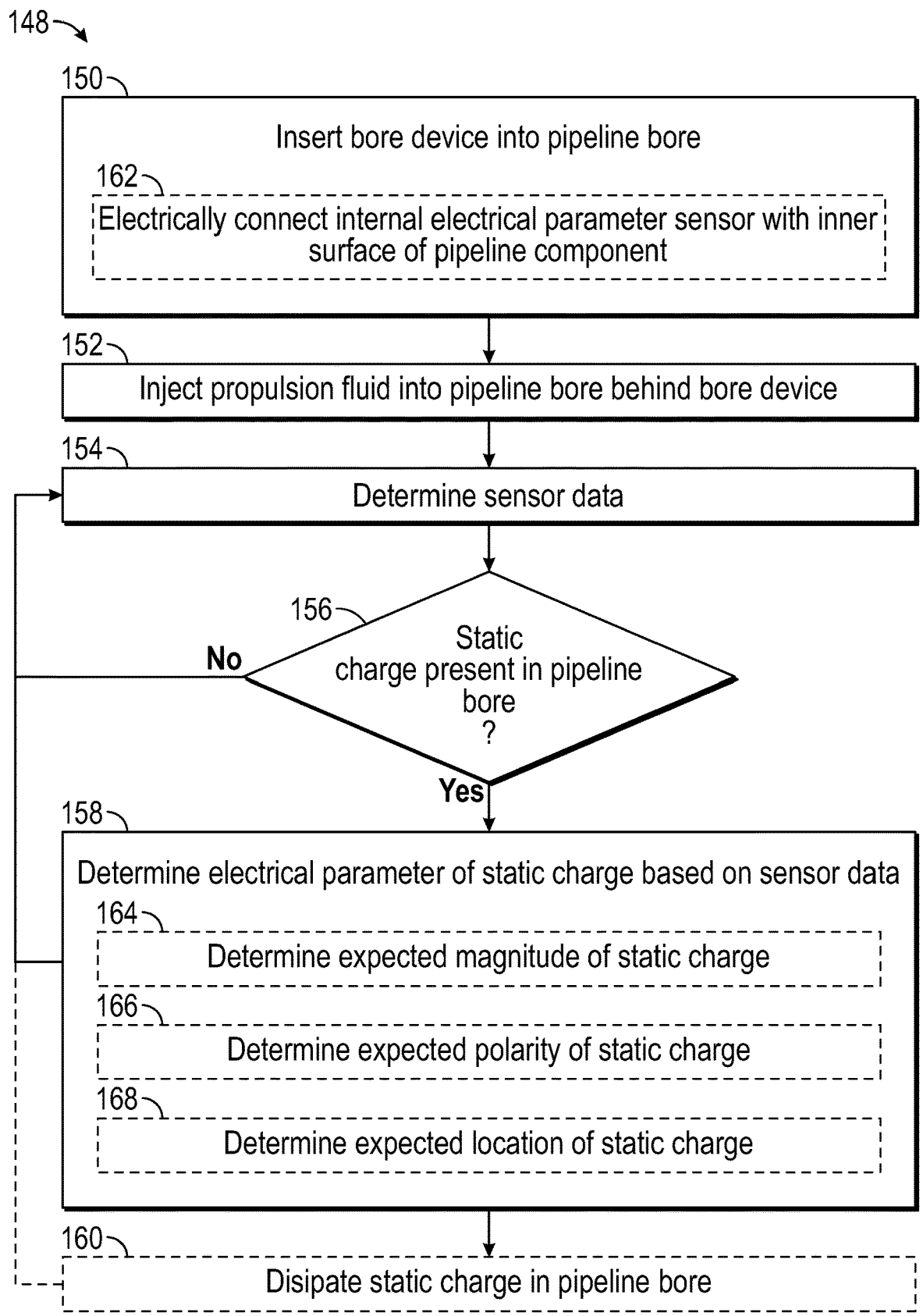
FIG. 11 is a flow diagram of an example of a process for operating the static charge testing system of FIG. 3, in accordance with an embodiment of the present disclosure.

To help further illustrate, an example of a process 148 for operating a static charge testing system 44 is described in FIG. 11. Generally, the process 148 includes inserting a bore device into a pipeline bore (process block 150) and injecting propulsion fluid into the pipeline bore behind the bore device (process block 152). Additionally, the process 148 generally includes determining sensor data (process block 154), determining whether static charge is present in the pipeline bore based on the sensor data (decision block 156), and, when the static charge is present in the pipeline bore, determining an electrical parameter of the static charge based on the sensor data (process block 158).

Although described in a specific order, which corresponds with an embodiment of the present disclosure, it should be appreciated that the example process 148 is merely intended to be illustrative and not limiting. In particular, in other embodiments, a process 148 for operating a static charge testing system 44 may include one or more additional process blocks and/or omit one or more of the depicted process blocks. For example, some embodiments of the process 148 may additionally include dissipating static charge in the pipeline bore (process block 160) while other embodiments of the process 148 do not.

In any case, as described above, a bore device 48 of a static charge testing system 44 may generally be implemented to be run (e.g., passed and/or moved) through a pipeline bore (e.g., pipe bore 32 and/or fitting bore 84) in a pipeline system 10. As such, operating the static charge testing system 44 may include inserting the bore device 48 into the pipeline bore (process block 150). In particular, in some embodiments, the bore device 48 may be inserted into the pipeline bore via a device (e.g., pig) launcher secured to the pipeline system 10, for example, which is manually controlled by a user and/or autonomously controlled by a control sub-system 46 of the static charge testing system 44.

To facilitate moving (e.g., pushing) the bore device 48 along the pipeline bore, a propulsion fluid source 50 in the static charge testing system 44 may then be operated to inject propulsion fluid 66 into the pipeline bore behind the bore device 48 (process block 152). As described above, in some embodiments, the propulsion fluid source 50 may be communicatively coupled to the control sub-system 46 in the static charge testing system 44, thereby enabling the control sub-system 46 to autonomously control operation of the propulsion fluid source 50. However, in other embodiments, operation of the propulsion fluid source 50 may additionally or alternatively be manually controlled by a user, such as an operator or a service technician.

As the bore device 48 moves along the pipeline bore, internal sensors 58A of the bore device 48 may be operated determine sensor data, for example, continuously or periodically (process block 154). In particular, as described above, in some embodiments, an internal location sensor 58A in the bore device 48 may determine sensor data indicative of location of the bore device 48 in the pipeline bore. Additionally, as described above, an internal electrical parameter sensor 58A in the bore device 48 may determine sensor data indicative of one or more electrical parameters encountered by the bore device 48. For example, an internal voltage sensor 58A may determine sensor data indicative of magnitude and/or polarity of voltage encountered by the bore device 48.

Furthermore, as described above, in some embodiments, an internal electrical parameter sensor 58A of the bore device 48 may determine sensor data based at least in part on electrical current induced in the internal electrical parameter sensor 58A. However, as described above, in other embodiments, an internal electrical parameter sensor 58A of the bore device 48 may determine sensor data based at least in part on an electrical connection with a pipeline component. Thus, in such embodiments, inserting the bore device 48 into the pipeline bore may include electrically connecting the internal electrical parameter sensor 58A in the bore device 48 to an inner surface of the pipeline component that defines the pipeline bore (process block 162).

In any case, the static charge testing system 44 may then determine whether static charge is present in the pipeline bore based at least in part on the sensor data determined by its one or more internal sensors 58A (decision block 156). In particular, as described above, sensor data determined by one or more internal electrical parameter sensors 58A of the bore device 48 may be indicative of the presence of static charge in the pipeline bore. Thus, to facilitate determining the presence of static charge, in some embodiments, the sensor data may be communicated from the bore device 48 to the control sub-system 46 for processing. For example, in some such embodiments, the control sub-system 46 may determine that static charge is expected to be present in the pipeline bore when the sensor data determined by an internal voltage sensor 58A of the bore device 48 is indicative of a non-zero voltage being present in the pipeline bore.

When static charge is expected to be present, to facilitate subsequent dissipation, the static charge testing system 44 may then determine one or more electrical parameters that are expected to be associated with the static charge based at least in part on the sensor data determined by one or more internal sensors 58A of the bore device 48 (process block 158). For example, to facilitate determining when static charge dissipation techniques should be deployed, in some embodiments, the static charge testing system 44 may determine an expected magnitude of the static charge detected in the pipeline bore based at least in part on the sensor data (process block 164). In particular, in some such embodiments, the static charge testing system 44 may determine that static charge dissipation techniques should be deployed immediately when the expected magnitude of the static charge is greater than a threshold magnitude and that deployment of the static charge dissipation techniques can wait (e.g., be delayed) when the magnitude of the static charge is not greater (e.g., less than or equal to) the threshold magnitude.

Additionally, to facilitate determining what type of static charge dissipation technique should be deployed, in some embodiments, the static charge testing system 44 may determine an expected polarity of the static charge based at least in part on the sensor data (process block 166). For example, in some such embodiments, the static charge testing system 44 may determine that positively ionized dissipation fluid should be flowed through the pipeline bore to dissipate static charge when the expected polarity of the static charge is negative. On the other hand, the static charge testing system 44 may determine that negatively ionized dissipation fluid should be flowed through the pipeline bore to dissipate static charge when the expected polarity of the static charge is positive, which, at least in some instances, may facilitate improving efficacy of the static charge dissipation techniques.

Moreover, to facilitate determining where static charge dissipation techniques should be deployed in the pipeline system 10, in some embodiments, the static charge testing system 44 may determine an expected location of the static charge based at least in part on the sensor data, which, at least in some instances, may facilitate improving operational efficiency of the pipeline system 10, for example, by enabling other portions of the pipeline system 10 to resume normal operation (process block 168). In particular, in some such embodiments, the static charge testing system 44 may determine the expected location of static charge at least in part by cross-correlating sensor data determined by one or more internal electrical parameter sensors 58A of the bore device 48 and sensor data determined by one or more (e.g., external and/or internal) location sensors 58. For example, the static charge testing system 44 may determine that static charge is expected to be present at a location of the bore device 48 that corresponds with a time at which sensor data determined by an internal voltage sensor 58A of the bore device 48 is indicative of a non-zero voltage being present in the pipeline bore.

Figure 12:
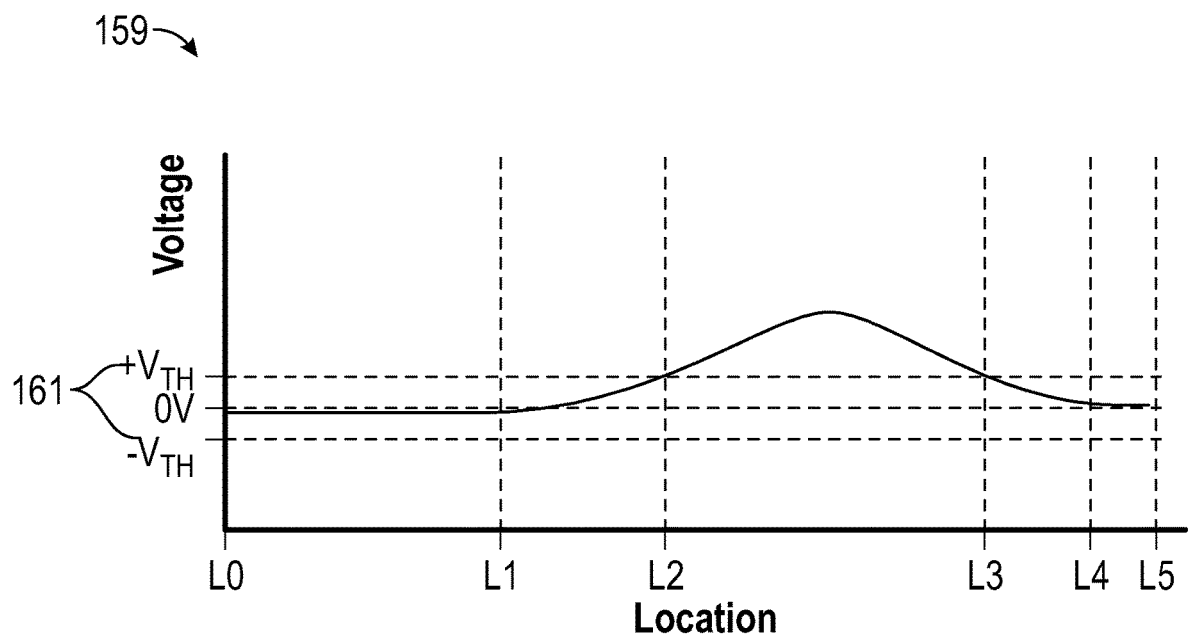
FIG. 12 is an example plot of sensor data determined by one or more sensors in the static charge testing system of FIG. 3, in accordance with an embodiment of the present disclosure.

To help further illustrate, an example of a plot 159 of sensor data determined by a static charge testing system 44 is shown in FIG. 12. As depicted, the plot 159 describes voltage sensed (e.g., measured) at locations from L0 to L5 along a pipeline bore in a pipeline system 10. In particular, as depicted, the sensed voltage is zero volts from L0 to L1 and from L4 to L5 in the pipeline bore. In other words, in some embodiments, a control sub-system 46 of the static charge testing system 44 may analyze (e.g., cross-correlate) the sensor data to determine that static charge is not expected to be present from L0 to L1 and from L4 to L5 in the pipeline bore.

However, as depicted, voltage sensed from L1 to L4 in the pipeline bore is non-zero. In other words, in some embodiments, the control sub-system 46 of the static charge testing system 44 may analyze (e.g., cross-correlate) the sensor data to determine that positive polarity static charge is expected to be present from L1 to L4 in the pipeline bore. Thus, to facilitate improving pipeline operational reliability, in some such embodiments, the control sub-system 46 may determine that a static charge dissipation process (e.g., using negatively ionized fluid) should be performed at least from L1 to L4 in the pipeline bore.

However, to facilitate improving pipeline operational efficiency, as described above, in some embodiments, when and/or where a static charge dissipation process should be performed in a pipeline bore may be determined based at least in part on a magnitude threshold 161. As depicted, the voltage sensed from L1 to L2 and from L3 to L4 in the pipeline bore is less than or equal to the magnitude threshold 161. In other words, in some embodiments, the control sub-system 46 of the static charge testing system 44 may analyze (e.g., cross-correlate) the sensor data to determine that performance of a static charge dissipation process from L1 to L2 and from L3 to L4 in the pipeline bore can be delayed (e.g., wait).

On the other hand, as depicted, the voltage sensed from L2 to L3 in the pipeline bore is greater than the magnitude threshold 161. In other words, in some embodiments, the control sub-system 46 of the static charge testing system 44 may analyze (e.g., cross-correlate) the sensor data to determine that performance of a static charge dissipation process at least from L2 to L3 in the pipeline bore should be performed immediately. In this manner, sensor data determined by a static charge testing system 44 may be analyzed to determine presence and/or one or more electrical parameters of static charge in a pipeline bore.

In any case, returning to the process 148 of FIG. 11, as described above, in some embodiments, the static charge testing system 44 itself may dissipate static charge in the pipeline bore (process block 160). To facilitate dissipating static charge, as described above, in some embodiments, the bore device 48 may include a switching device 78 implemented between electrically conductive material 74 on the outer surface 76 of the bore device 48, an internal electrical parameter sensor 58A in the bore device 48, and a wired connection 72 that is connected to the bore device 48 while the bore device 48 is disposed in the pipeline bore. Additionally, as described above, in such embodiments, the opposite end of the wired connection 72 may be connected to ground 80, for example, which is used by the control sub-system 46 of the static charge testing system 44.

Thus, in such embodiments, to enable the internal electrical parameter sensor 58A to determine sensor data, the switching device 78 may be operated to electrically connect the electrically conductive material 74 on the outer surface 76 of the bore device 48 to the internal electrical parameter sensor 58A and to electrically disconnect the electrically conductive material 74 from the wired connection 72. On the other hand, to facilitate dissipating static charge, the switching device 78 may be operated to electrically disconnect the electrically conductive material 74 on the outer surface 76 of the bore device 48 from the internal electrical parameter sensor 58A and to electrically connect the electrically conductive material 74 to the wired connection 72, thereby providing a dedicated path to ground 80, which, at least in some instances, may reduce the likelihood that the static charge dissipates via an electrical arc. In fact, in some such embodiments, the static charge testing system 44 may instruct the switching device 78 to switching from connecting the electrically conductive material 74 on the outer surface 76 of the bore device 48 to the internal electrical parameter sensor 58A to connecting the electrically conductive material 74 to the wired connection 72 in response to sensor data determined by the internal electrical parameter sensor 58A being indicative of static charge being present at the current location of the bore device 48, for example, via one or more control signals 60.

As briefly mentioned above, ionic fluid may be flowed through a pipeline bore to facilitate dissipating static charge present in the pipeline bore. In fact, in some embodiments, the propulsion fluid 66 used to move a bore device 48 in a pipeline bore may be an ionic fluid, such as saltwater. In other words, in such embodiments, the ionic propulsion fluid 66 may facilitate dissipating static charge encountered by the bore device 48 after the bore device 48 has moved past the static charge. Thus, to facilitate confirming that the static charge has been successfully dissipated, in some such embodiments, another bore device 48 of the static charge testing system 44 may be run through the pipeline bore, for example, while the bore device 48 is still in the pipeline bore.

Figure 13:
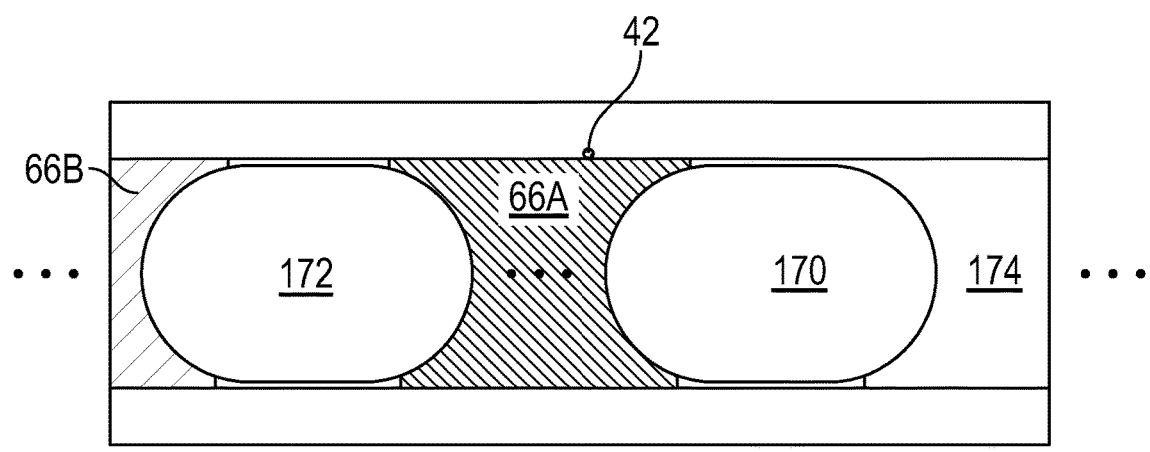
FIG. 13 is an axial cross-section profile of multiple bore devices of FIG. 3 deployed in a pipeline bore, in accordance with an embodiment of the present disclosure.

To help illustrate, an example of multiple bore devices 48—namely a first bore device 170 and a second bore device 172—disposed in a pipeline (e.g., pipe and/or fitting) bore 174 is shown in FIG. 13. As depicted, first propulsion fluid 66A is present to the left of the first bore device 170 and, thus, when pressurized, the first propulsion fluid 66A may facilitate pushing the first bore device 170 from left to right in the pipeline bore 174. In particular, as depicted, the first propulsion fluid 66A contacts a molecule 42 along the pipeline bore 174 at which the first bore device 170 encountered static charge and, thus, may facilitate dissipating the static charge when the first propulsion fluid 66A is an ionic fluid. In fact, in some embodiments, using an ionic fluid as the first propulsion fluid 66A may facilitate dissipating static charge that results from the first bore device 170 contacting (e.g., rubbing against) the inner surface of a pipeline component that defines at least a section of the pipeline bore 174.

In other words, static charge detected by the first bore device 170 may be dissipated after the first bore device 170 has moved past the static charge. Thus, when a static charge testing system 44 includes a single bore device 48, the bore device 48 would need to be re-run through the pipeline bore 174 to confirm that the static charge detected in its previous run (e.g., pass) through the pipeline bore 174 has been successfully dissipated. In other words, in such instances, the static charge testing system 44 would need to wait for the bore device 48 to complete its previous run before re-running the bore device 48 through the pipeline bore 174, which, at least in some instances, may limit testing efficiency of the static charge testing system 44.

To facilitate improving testing efficiency, as depicted, the second bore device 172 is moved in the pipeline bore 174 behind the first bore device 170 via second propulsion fluid 66B. In particular, as depicted, the second bore device 172 is moved in the pipeline bore 174 while the first bore device 170 is still disposed in the pipeline bore 174. In other words, in the depicted example, a static charge testing system 44 may confirm that static charge encountered by the first bore device 170 in the pipeline bore 174 has been successfully dissipated before the first bore device 170 has completed its run through the pipeline bore 174, which, at least in some instances, may facilitate improving testing efficiency, for example, at least in part by reducing testing duration.

In some embodiments, the second bore device 172 may be run through the pipeline bore 174 in response to sensor data determined by the first bore device 170 being indicative of static charge being present in the pipeline bore 174. However, since approximately the same amount of propulsion fluid 66 would be used to move the first bore device 170 through the pipeline bore 174 whether or not the second bore device 172 is concurrently moved through the pipeline bore 174, in other embodiments, the second bore device 172 may be preemptively run through the pipeline bore 174 behind the first bore device 170. In other words, in such embodiments, the second bore device 172 may be inserted into the pipeline bore 174 even when the first bore device 170 has not yet determined sensor data indicative of static charge being present in the pipeline bore 174. For example, in such embodiments, the second bore device 172 may be inserted into the pipeline bore 174 a set (e.g., fixed) distance behind and/or a set duration after the first bore device 170. In this manner, the techniques described in the present disclosure may facilitate detecting and/or dissipating static charge present in a pipeline (e.g., pipe and/or fitting) bore of a pipeline system, which, at least in some instances, may facilitate improving operational reliability of the pipeline system, for example, at least in part by reducing the likelihood of electrical arcing occurring in the pipeline system.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system comprising:
   a pipe segment, wherein the pipe segment comprises tubing that defines a pipe bore and a fluid conduit within an annulus of the tubing;
   a bore device configured to be moved through the pipe bore of the pipe segment, wherein the bore device comprises:
     an internal sensor configured to determine sensor data indicative of an electrical parameter that the bore device encounters while disposed in the pipe bore of the pipe segment; and
     fluid blocking material implemented around the internal sensor; and
   a control sub-system communicatively coupled to the bore device, wherein the control sub-system is configured to determine whether static charge is expected to be present in the pipe bore of the pipe segment based at least in part on the sensor data determined by the internal sensor of the bore device.

2. The system of claim 1, comprising a propulsion fluid source to be fluidly coupled to the pipe bore of the pipe segment, wherein the propulsion fluid source is configured to inject ionic propulsion fluid into the pipe bore behind the bore device to facilitate:
   moving the bore device along the pipe bore; and
   dissipating static charge present in the pipe bore.

3. The system of claim 2, wherein the ionic propulsion fluid comprises saltwater.

4. The system of claim 1, comprising a location sensor configured to determine other sensor data indicative of location of the bore device in the pipe bore of the pipe segment, wherein, when the static charge is expected to be present, the control sub-system is configured to determine an expected location of the static charge in the pipe bore based at least in part on a cross-correlation between the sensor data determined by the internal sensor of the bore device and the other sensor data determined by the location sensor.

5. The system of claim 1, wherein:
   the internal sensor of the bore device is encased within the fluid blocking material of the bore device; and
   the internal sensor is configured to determine the sensor data based at least in part on capacitive coupling that results in the internal sensor due to an electric field.

6. The system of claim 1, wherein an outer surface of the bore device comprises the fluid blocking material and electrically conductive material, wherein, when the electrically conductive material is connected to the internal sensor of the bore device, the internal sensor is configured to determine the sensor data based on an electrical connection with a tubing inner surface that defines the pipe bore of the pipe segment.

7. The system of claim 6, comprising a wired connection coupled to the control sub-system and the bore device, wherein the bore device comprises a switching device implemented between the wired connection, the electrically conductive material on the outer surface of the bore device, and the internal sensor of the bore device, wherein the switching device is configured to:
   connect the electrically conductive material on the outer surface of the bore device to the internal sensor of the bore device to enable the internal sensor to determine the sensor data; and
   connect the electrically conductive material on the outer surface of the bore device to the wired connection to facilitate dissipating static charge encountered by the bore device in the pipe bore of the pipe segment.

8. The system of claim 1, comprising a pipe fitting secured to the pipe segment, wherein:
the pipe fitting comprises a fitting body that defines a fitting bore fluidly coupled to the pipe bore of the pipe segment, wherein a diameter of the fitting bore is smaller than a diameter of the pipe bore; and
the bore device is configured to be moved through the fitting bore of the pipe fitting and the pipe bore of the pipe segment.

9. The system of claim 8, wherein:
the fluid blocking material of the bore device defines an internal cavity within the bore device and an outer surface of the bore device with a tapered end, wherein the tapered end and the internal cavity are configured to enable the outer surface of the bore device to contract radially inward when the bore device passes from the pipe bore of the pipe segment to the fitting bore of the pipe fitting; and
the bore device comprises a spring disposed within the internal cavity, wherein the spring is configured to facilitate expanding the outer surface of the bore device radially outward when the bore device passes from the fitting bore of the pipe fitting to the pipe bore of the pipe segment.

10. The system of claim 1, comprising another bore device configured to be moved through the pipe bore of the pipe segment behind the bore device, wherein:
the other bore device comprises:
another internal sensor configured to determine other sensor data indicative of another electrical parameter that the other bore device encounters in the pipe bore of the pipe segment; and
other fluid blocking material implemented around the other internal sensor; and
when the control sub-system determines that static charge is expected to be present in the pipe bore based on the sensor data determined by the bore device, the control sub-system is configured to determine whether the static charge has been successfully dissipated based on the other sensor data determined by the other bore device.

11. The system of claim 10, wherein the bore device and the other bore device are configured to be concurrently disposed within the pipe bore of the pipe segment.

12. A method of operating a static charge testing system, comprising:
inserting a first bore device of the static charge testing system into a pipeline bore of a pipeline system;
injecting first propulsion fluid into the pipeline bore behind the first bore device to facilitate moving the first bore device along the pipeline bore;
determining, using a first sensor in the first bore device, first sensor data indicative of presence of static charge in the pipeline bore while the first bore device is disposed in the pipeline bore;
inserting a second bore device of the static charge testing system into the pipeline bore of the pipeline system;
injecting second propulsion fluid into the pipeline bore behind the second bore device to facilitate moving the second bore device along the pipeline bore while the first bore device is concurrently disposed in the pipeline bore; and
determining, using a second sensor in the second bore device, second sensor data indicative of whether static charge encountered by the first bore device in the pipeline bore has been successfully dissipated.

13. The method of claim 12, wherein injecting the first propulsion fluid into the pipeline bore comprises injecting ionic fluid into the pipeline bore to facilitate dissipating static charge encountered by the first bore device in the pipeline bore after the first bore device has moved past the static charge.

14. The method of claim 12, wherein:
determining the first sensor data comprises determining the first sensor data based at least in part on first capacitive coupling that results in the first sensor due to a first electric field; and
determining the second sensor data comprises determining the second sensor data based at least in part on second capacitive coupling that results in the second sensor of the second bore device due to a second electric field.

15. The method of claim 12, wherein determining the first sensor data comprises:
connecting, using a switching device in the first bore device, electrically conductive material exposed on an outer surface of the first bore device to the first sensor of the first bore device; and
disconnecting, using the switching device in the first bore device, the electrically conductive material exposed on the outer surface of the first bore device from a wired connection that is connected to the first bore device while the first bore device is disposed in the pipeline bore.

16. The method of claim 15, comprising, when the first sensor data is indicative of static charge being present in the pipeline bore:
disconnecting, using the switching device in the first bore device, the electrically conductive material exposed on the outer surface of the first bore device from the first sensor of the first bore device; and
connecting, using the switching device in the first bore device, the electrically conductive material exposed on the outer surface of the first bore device to the wired connection that is connected to the first bore device while the first bore device is disposed in the pipeline bore, wherein an opposite end of the wired connection is coupled to ground.

17. The method of claim 12, comprising:
covering, using a cover assembly of the first bore device, electrically conductive material on an outer surface of the first bore device while the first bore device is passing through a fitting bore section of the pipeline bore; and
exposing using the cover assembly of the first bore device, the electrically conductive material on the outer surface of the first bore device while the first bore device is passing through a pipe bore section of the pipeline bore.

18. A static charge testing system comprising a bore device, wherein the bore device comprises:
an electrical parameter sensor that is connected to electrically conductive material on an outer surface of the bore device;
fluid blocking material implemented around the electrical parameter sensor to:
define the outer surface of the bore device with a tapered end; and
define an internal cavity within the bore device, wherein the tapered end and the internal cavity of the bore device are configured to enable the outer surface of the bore device to contract radially inward when the bore device passes from a first pipe bore of a first pipe segment to a fitting bore of a pipe fitting that is secured to the first pipe segment; and a spring disposed within the internal cavity of the bore device, wherein the spring is configured to facilitate expanding the outer surface of the bore device radially outward when the bore device passes from the fitting bore of the pipe fitting to a second pipe bore of a second pipe segment that is secured to the pipe fitting;

a control sub-system communicatively coupled to bore device, wherein the control sub-system is configured to determine whether static charge is expected to be present based at least in part on sensor data determined by the electrical parameter sensor in the bore device; and a propulsion fluid source configured to inject ionic propulsion fluid behind the bore device to facilitate moving the bore device and dissipating static charge encountered by the bore device after the bore device has moved past the static charge.

19. The static charge testing system of claim 18, wherein the bore device comprises a cover assembly configured to:

cover the electrically conductive material on the outer surface of the bore device while the bore device is passing through the fitting bore of the pipe fitting; and expose the electrically conductive material on the outer surface of the bore device while the bore device is passing through the first pipe bore of the first pipe segment and while the bore device is passing through the second pipe bore of the second pipe segment.

\* \* \* \* \*